(12) United States Patent
Matsumoto et al.

(10) Patent No.: US 8,791,230 B2
(45) Date of Patent: *Jul. 29, 2014

(54) METHOD FOR PRODUCING PARTICULATE WATER ABSORBENT RESIN

(75) Inventors: Satoshi Matsumoto, Himeji (JP); Syuji Kanzaki, Himeji (JP); Kazumasa Konishi, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/702,668

(22) PCT Filed: Jun. 8, 2011

(86) PCT No.: PCT/JP2011/063169
§ 371 (c)(1),
(2), (4) Date: Jun. 18, 2013

(87) PCT Pub. No.: WO2011/155540
PCT Pub. Date: Dec. 15, 2011

(65) Prior Publication Data
US 2013/0261276 A1 Oct. 3, 2013

(30) Foreign Application Priority Data

Jun. 8, 2010 (JP) .................. 2010-130608

(51) Int. Cl.
*C08F 6/00* (2006.01)
*C08G 75/02* (2006.01)

(52) U.S. Cl.
USPC ........................................ 528/481; 528/480

(58) Field of Classification Search
USPC .............................................. 528/480, 481
See application file for complete search history.

(56) References Cited

U.S. PATENT DOCUMENTS

| | | | |
|---|---|---|---|
| 6,359,049 B1 | 3/2002 | Carrico et al. | |
| 6,444,744 B1 | 9/2002 | Fujimaru et al. | |
| 8,188,163 B2 * | 5/2012 | Matsumoto et al. | 523/330 |
| 2005/0013865 A1 | 1/2005 | Nestler et al. | |
| 2005/0085604 A1 | 4/2005 | Handa et al. | |
| 2006/0074160 A1 | 4/2006 | Handa et al. | |
| 2006/0089512 A1 | 4/2006 | Bennett et al. | |
| 2007/0293632 A1 | 12/2007 | Riegel et al. | |
| 2008/0161512 A1 | 7/2008 | Kawano et al. | |
| 2008/0214749 A1 | 9/2008 | Weismantel et al. | |
| 2009/0275470 A1 | 11/2009 | Nagasawa et al. | |
| 2009/0312183 A1 | 12/2009 | Fujimaru et al. | |
| 2010/0009846 A1 | 1/2010 | Ikeuchi et al. | |
| 2010/0016522 A1 | 1/2010 | Stueven et al. | |
| 2010/0041550 A1 | 2/2010 | Riegel et al. | |
| 2010/0249320 A1 | 9/2010 | Matsumoto et al. | |
| 2010/0286287 A1 | 11/2010 | Walden | |
| 2011/0015351 A1 | 1/2011 | Nogi et al. | |
| 2011/0042612 A1 | 2/2011 | Riegel et al. | |
| 2011/0046279 A9 | 2/2011 | Ikeuchi et al. | |

FOREIGN PATENT DOCUMENTS

| | | |
|---|---|---|
| EP | 1645596 | 4/2006 |
| JP | 5-086251 | 4/1993 |
| JP | 7-270070 | 10/1995 |
| JP | 8-073518 | 3/1996 |
| JP | 8-121964 | 5/1996 |
| JP | 2000-327926 | 11/2000 |
| JP | 3297192 | 4/2002 |
| JP | 2003-052742 | 2/2003 |
| JP | 2003-206381 | 7/2003 |
| JP | 2005-247931 | 9/2005 |
| JP | 2007-071415 | 3/2007 |
| JP | 2010-004743 | 1/2010 |
| JP | 2010-053296 | 3/2010 |
| WO | 03/051940 | 6/2003 |
| WO | 2004/084962 | 10/2004 |
| WO | 2004/085496 | 10/2004 |
| WO | 2005/054356 | 6/2005 |
| WO | 2007/072969 | 6/2007 |
| WO | 2008/015946 | 2/2008 |
| WO | 2008/087114 | 7/2008 |
| WO | 2009/011717 | 1/2009 |
| WO | 2009/113679 | 9/2009 |

OTHER PUBLICATIONS

Buchholz et al. "Modern Superabsorbent Polymer Technology" *Wiley-VCH*, p. 85-93 (1998).

\* cited by examiner

*Primary Examiner* — Terressa Boykin
(74) *Attorney, Agent, or Firm* — Cesari and McKenna, LLP

(57) ABSTRACT

A method for reducing colored foreign substances in a water absorbent resin by a convenient and simple technique in the production of a water absorbent resin, without requiring any modification of raw materials or high capital investment, is provided. The method for producing a particulate water absorbent resin includes a step of polymerizing an aqueous solution of an unsaturated monomer; and a step of drying a particulate water-containing gel-like cross-linked polymer having a solids concentration of 30% by weight or greater that is obtainable in a gel grain refining step during polymerization or after polymerization, with one or more apparatuses for aerating a water absorbent resin with a high temperature gas stream being installed in the drying step and/or in at least one of the subsequent steps, while in the aerating apparatus, the high temperature gas stream is passed through a filter and then is reused in the same step as the step where the aerating apparatus is installed, or in a different step.

20 Claims, 4 Drawing Sheets

METHOD FOR PRODUCING PARTICULATE WATER ABSORBENT RESIN

CROSS REFERENCE TO RELATED APPLICATIONS

This application is a National Stage of International Application No. PCT/JP2011/063169 filed on Jun. 8, 2011, which claims priority to Japanese Application No. 2010-130608 filed Jun. 8, 2010, the contents of which are hereby incorporated by reference in their entirety.

TECHNICAL FIELD

The present invention relates to a method for producing a particulate water absorbent resin, and more particularly, to a method for producing a particulate water absorbent resin, which can reduce incorporation of colored foreign substances at low cost, without decreasing the water absorption performance. Particularly, the present invention relates to a method for producing a particulate water absorbent resin, which can rapidly perform uniform drying in a drying step.

BACKGROUND ART

Water absorbent resins are widely used in various applications including sanitary materials such as disposable diapers, sanitary napkins, and incontinence products for adults, and water retention agents for soil, due to their physical properties of absorbing aqueous liquids in amounts as large as several times to several hundred times the resins' own weights. Thus, water absorbent resins are produced and consumed in large quantities. These water absorbent resins (also called superabsorbent resins or water absorbent polymers) are described in, for example, the Japanese Industrial Standards (JIS) K7223-1996, and have also been introduced in many commercially available reference books.

Absorbent resins are generally provided in a powdered state, by polymerizing a hydrophilic unsaturated monomer to thereby obtain a polymer gel, and drying this. As the hydrophilic unsaturated monomer, acrylic acid (salt), particularly sodium acrylate that has been partially neutralized, is used. The polymer gel obtained by polymerizing a monomer is frequently obtained in an agglomerated form or as aggregates of polymer gel particles, and usually, the polymer gel is dried up to a solids concentration of about 95% by weight, subsequently pulverized into particles having a desired size, and classified. A water absorbent resin thus obtained is preferably subjected to a surface crosslinking step, and thus a water absorbent resin having an excellent absorption capacity under load or excellent liquid permeability is obtained. Specifically, the surface crosslinking step means a step for forming a layer having a high crosslinking density in the vicinity of the surface of the water absorbent resin, by adding a monomer or a crosslinking agent to the water absorbent resin, and allowing the mixture to react under the action of light or heat.

When a water absorbent resin is used as a sanitary material, a preferred color tone of the water absorbent resin is white, due to its clean image. Particularly, in recent years, in absorbent cores such as disposable diapers, in which the amount of the water absorbent resin is large while the amount of pulp is small, since the color of the water absorbent resin is conspicuous, a water absorbent resin is requested to have a color that is closer to the white color. However, various factors may cause the color tone of the water absorbent resin immediately after production (initial color) to turn yellow, or may cause a phenomenon (coloration over time) in which coloration (yellowing, or further coloring to brown) proceeds as a result of storage of the water absorbent resin under high temperature high humidity conditions.

In regard to this problem, various solutions have been hitherto provided. For example, Patent Literatures 1 to 7 have been suggested as technologies for preventing coloration of a water absorbent resin, which pay attention to the polymerization inhibitor. That is, a polymerization inhibitor, for example, a methoxyphenol compound, is added to the monomer so as to prevent unintended polymerization, and Patent Literature 1 discloses a method for producing a water absorbent resin in which coloration is reduced by polymerizing a methoxyphenol compound at a particular concentration. Furthermore, Patent Literatures 1 and 2 disclose the use of activated carbon in order to decrease methoxyphenols. Furthermore, in Patent Literature 3, coloration is reduced by using an N-oxyl compound or a manganese compound instead of a methoxyphenol compound. Patent Literature 4 suggests a technology of using a tocopherol compound as a polymerization inhibitor. Patent Literature 5 suggests a technology of using a hindered (methoxy)phenol compound as a polymerization inhibitor. Patent Literature 6 suggests a technology of reducing, as a polymerization inhibitor, the amount of hydroquinone which is a residual polymerization inhibitor in acrylic acid, to 0.2 ppm or less.

As another method for preventing coloration, as a technology for preventing coloration of a water absorbent resin which pays attention to the polymerization initiator, Patent Literature 7 has disclosed that an oxidizing agent such as a persulfate is used as a polymerization initiator, but the compound interacts with a methoxyphenol compound and causes coloration over time, and then suggested an initiator system which does not undergo coloration. Furthermore, Patent Literature 8 has suggested a technology for preventing coloration which uses a particular reducing agent for polymerization.

Furthermore, various coloration preventing agents for water absorbent resins have also been suggested in Patent Literatures 9 to 18, and specifically, Patent Literatures 9 to 11 suggest addition of a metal chelator; Patent Literature 12 suggests addition of an organic acid; Patent Literature 13 suggests addition of an α-hydroxycarboxylic acid; Patent Literatures 14 and 15 suggest addition of a polyvalent metal organic acid salt for surface crosslinking; Patent Literatures 16 to 18 suggest addition of a reducing agent such as a sulfite or a hypophosphite; and Patent Literature 19 suggests a technology for preventing coloration by adding an oxidation inhibitor to the water absorbent resin. Furthermore, as technologies for combined use of coloration preventing agents for the water absorbent resin, Patent Literature 20 suggests addition of an organic acid and a reducing agent to the water absorbent resin; Patent Literature 21 suggests addition of a chelating agent and a phosphorus compound to the water absorbent resin; Patent Literature 22 suggests addition of a reducing agent and an oxidation inhibitor; and Patent Literature 23 suggests addition of a chelating agent and a reducing agent to the water absorbent resin.

Furthermore, as a technology which pays attention to the cause of coloration, Patent Literature 24 has paid attention to oxygen and discloses drying or surface crosslinking in a state in which the oxygen partial pressure is decreased. Furthermore, Patent Literatures 25 and 26 have also suggested technologies which pay attention to the amount of Fe in caustic soda or polyvalent metals, which are raw materials of the water absorbent resin.

However, although the technologies of Patent Literatures 1 to 26 can reduce coloration, these are cost-consuming technologies because the number of steps is increased, and the substances to be added are increased. Furthermore, when it is intended to increase the amount of substances that are added to suppress coloration, there is a problem that the water absorption capacity decreases at least proportionally to the amount of addition, or even to a larger extent.

Meanwhile, since colored foreign substances (usually, colored particles having a size of about 0.1 mm to 1 mm) of organic substances such as a burnt water absorbent resin are present after a drying step, and unlike metallic foreign substances, a colored water absorbent resin cannot be removed with a magnet, Patent Literature 27 describes a method of selecting and removing these colored materials based on their color tones. However, there are problems with the detection of colored foreign substances, or with the cost for introducing a removing apparatus, and there is a problem that when the production output of the water absorbent resin is large, the detection of colored foreign substances may be omitted, or normal white water absorbent resins may also be removed together with the foreign substances, so that a large loss may occur.

Furthermore, as a conventional technology for drying the water absorbent resin, a method of using a ventilated band type dryer is disclosed in Patent Literatures 28 to 32 and Non-Patent Literature 1. Furthermore, a technology of using a cyclone in a method for fluidized drying in a fluidized bed is disclosed in Patent Literature 33. However, these Patent Literatures 28 to 33 neither disclose nor suggest the problems and effects of the present invention, and also, the literatures neither disclose nor suggest the passage of hot air through a filter in a ventilated band type dryer, or removal of the water absorbent resin particles or a water-containing gel thereof.

CITATION LIST

Patent Literature

Patent Literature 1: WO 2003/051940
Patent Literature 2: US Patent Application Publication No. 2006/0089512
Patent Literature 3: US Patent Application Publication No. 2010/0009846
Patent Literature 4: WO 2005/54356
Patent Literature 5: US Patent Application Publication No. 2005/0013865
Patent Literature 6: U.S. Pat. No. 6,444,744
Patent Literature 7: WO 2004/085496
Patent Literature 8: WO 2004/084962
Patent Literature 9: Japanese Patent Application Laid-Open (JP-A) No. 2003-206381
Patent Literature 10: JP-A No. 5-086251
Patent Literature 11: US Patent Application Publication No. 2011/0046279
Patent Literature 12: JP-A No. 2000-327926
Patent Literature 13: US Patent Application Publication No. 2009/0312183
Patent Literature 14: US Patent Application Publication No. 2011/0042612
Patent Literature 15: US Patent Application Publication No. 2010/0041550
Patent Literature 16: U.S. Pat. No. 6,359,049
Patent Literature 17: US Patent Application Publication No. 2010/0286287
Patent Literature 18: US Patent Application Publication No. 2006/0074160
Patent Literature 19: WO 2009/011717
Patent Literature 20: JP-A No. 2003-052742
Patent Literature 21: US Patent Application Publication No. 2009/0275470
Patent Literature 22: EP 1645596 A1
Patent Literature 23: US Patent Application Publication No. 2005/0085604
Patent Literature 24: US Patent Application Publication No. 2007/0293632
Patent Literature 25: US Patent Application Publication No. 2008/0161512
Patent Literature 26: WO 2007/072969
Patent Literature 27: WO 2008/015946
Patent Literature 28: US Patent Application Publication No. 2008/214749
Patent Literature 29: WO 2008/087114
Patent Literature 30: US Patent Application Publication No. 2010/0016522
Patent Literature 31: JP-A No. 8-073518
Patent Literature 32: JP-A No. 7-270070
Patent Literature 33: US Patent Application Publication No. 2010/0249320
Non-Patent Literature 1: Modern Superabsorbent Polymer Technology (1998) p. 85-93

SUMMARY OF INVENTION

Technical Problem

In view of the problems of the prior art as described above, an object of the present invention is to provide a method for producing a particulate water absorbent resin, which reduces colored foreign substances of a water absorbent resin, particularly colored foreign substances originating from a water absorbent resin, without increasing the cost and deteriorating the physical properties of the water absorbent resin.

Another object of the present invention is to provide a method for stably producing, at low cost, a water absorbent resin which is free from coloration or foreign substances and has excellent water absorption performance (particularly, the water absorption capacity or the rate of water absorption), and particularly, a method for stably producing (particularly, a drying method), at low cost, a water absorbent resin which is free from initial coloration or colored foreign substances.

Solution to Problem

The inventors of the present invention conducted a thorough investigation in order to achieve the objects described above, and as a result, the inventors solved the objects described above by elucidating the cause (a factor) of coloration, and fundamentally eliminating the causative substance. That is, the inventors of the present invention investigated the origins of colored foreign substances, and as a result, the inventors clarified that the "water absorbent resin particles that are entrained in the gas stream used in a step of aerating a water absorbent resin with a gas stream at a high temperature, and have entered a gas pipe," to which no attention has been hitherto paid in Patent Literatures 1 to 27 and the like, are a factor of the causative substances of colored foreign substances, and found that colored foreign substances can be reduced by preventing incorporation of colored water absorbent resin particles into a normal white water absorbent resin when the gas stream is heated and reused. Thus, the inventors completed the present invention.

That is, in order to solve the problems described above, the present invention provides a method for producing a particulate water absorbent resin, the method including a step of polymerizing an aqueous solution of an unsaturated monomer; and a step of drying a particulate water-containing gel-like cross-linked polymer having a solids concentration of 30% by weight or greater that is obtainable in a gel grain refining step during polymerization or after polymerization, with one or more apparatuses for aerating any one of the particulate water-containing gel-like cross-linked polymer, a dried product, a pulverization product or a classification product thereof as a water absorbent resin with a high temperature gas stream being installed in the drying step and/or in at least one of the subsequent steps, wherein in the aerating apparatus, the high temperature gas stream used for aeration is passed through a filter and then a portion or all of the high temperature gas stream is reused in the same step as the step where the aerating apparatus is installed, or in a different step (first production method).

Furthermore, in order to solve the problems described above, a second production method of the present invention as a subordinate concept of the first production method is a method for producing a particulate water absorbent resin, the method including a step of polymerizing an aqueous solution of an unsaturated monomer; and a step of drying a particulate water-containing gel-like cross-linked polymer having a solids concentration of 30% by weight or greater that is obtainable in a gel grain refining step during polymerization or after polymerization, with one or more apparatuses for aerating a water absorbent resin with a high temperature gas stream in the drying step and/or in at least one of the subsequent steps, wherein the aerating apparatus is a ventilated dryer used in the drying step; and in the drying step using the ventilated dryer, the high temperature gas stream is reheated before reuse, and is passed through a filter having a ratio of opening area of 1 to 70%, which is composed of any one or more of a wire mesh that is installed before the reheating and a punching metal that is installed after the reheating, and then the water absorbent resin is aerated with the high temperature gas stream under the conditions of a flow rate of 0.1 to 5 [m/s] and a temperature of 100° C. to 250° C. (second production method).

Advantageous Effects of Invention

In the production of the particulate water absorbent resin of the present invention, incorporation of colored foreign substances can be reduced without a significant cost increase or deterioration of physical properties. Particularly, as a method for obtaining a particulate water absorbent resin by drying a particulate water-containing gel-like cross-linked polymer having a solids concentration of 45% by weight or greater, further 50% by weight or greater, and particularly 55% by weight or greater, the provided method is an efficient method for producing a water absorbent resin having maintained or improved physical properties (for example, water absorption capacity, water-extractables, residual monomers, and the like) and free of coloration. The water absorbent resin can be efficiently produced without coloration even if the scale is increased or the polymerization concentration (solids concentration) is increased.

BRIEF DESCRIPTION OF DRAWINGS

In FIG. 1, reference numeral 1 represents an aerating apparatus (ventilated chamber); 2 a belt conveyor; 3 a water absorbent resin; 4 a blower; 5 a filter; 6 a heat exchanger; 7 a pipe; 8 a gas discharge pipe; 9 a gas inlet port; and the "arrow" the direction of the high temperature gas stream.

In FIG. 2, reference numeral 1 represents a ventilated chamber; 2 a belt conveyor; 3 a water absorbent resin; 4 a blower; 5 a filter; 6 a heat exchanger; 7 a pipe; 8 a gas discharge pipe; 9 an air inlet port; 10 another step; and the "arrow" the direction of the high temperature gas stream.

In FIG. 3, reference numeral 1 represents an aerating apparatus (ventilated chamber); 2 a belt conveyor; 3 a water absorbent resin; 4 a blower; 5 a filter; 6 a heat exchanger; 7 a pipe; 8 a gas discharge pipe; 9 a gas inlet port; and the "arrow" the direction of the high temperature gas stream.

In FIG. 4, reference numeral 1 represents an aerating apparatus (ventilated chamber); 2 a belt conveyor; 3 a water absorbent resin; 4 a blower; 5 a first filter; 6 a heat exchanger; 7 a pipe; 8 a gas discharge pipe; 9 a gas inlet port; 11 a second filter; and the "arrow" the direction of the high temperature gas stream.

DESCRIPTION OF EMBODIMENTS

Figure 1:
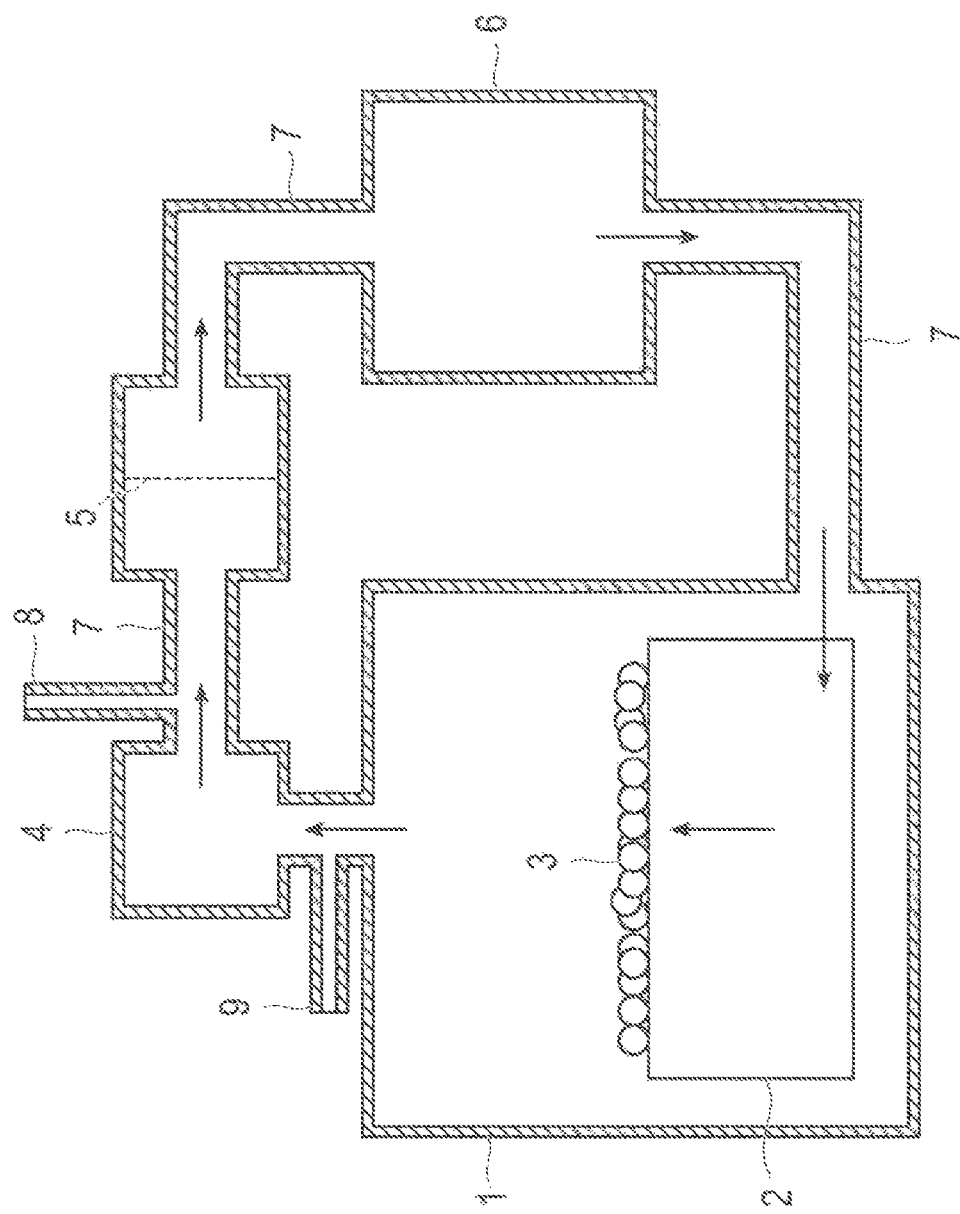
FIG. 1 is a schematic diagram illustrating an exemplary embodiment of the present invention.

Hereinafter, the method for producing a water absorbent resin according to the present invention will be described in detail. However, the scope of the present invention is not intended to be restrained by these descriptions, and embodiments other than the following examples can also be appropriately modified and carried out to the extent that the purport of the present invention is not impaired. Specifically, the present invention is not intended to be limited to the various exemplary embodiments described below, and can be modified into various embodiments within the scope illustrated by the claims. Exemplary embodiments that can be obtained by appropriately combining the technical means that are respectively disclosed in different exemplary embodiments are also included in the technical scope of the present invention.

According to the embodiments of the present invention, production of a large scale (for example, the production output of the water absorbent resin is 1 [t/hr] or greater per line) by means of production facilities is preferred. Furthermore, it is industrially preferable that various steps including the steps before and after the drying step be connected to each other, and the water absorbent resin be continuously produced on the whole.

[1] DEFINITIONS OF TERMS (1-1) "Water Absorbent Resin"

The term "water absorbent resin" according to the present invention means a water-swellable, water-insoluble polymer gelling agent. Meanwhile, the term "water-swellable" means that the CRC (absorption capacity without load) defined in ERT441.2-02 is usually 5 [g/g] or higher, preferably 10 to 100 [g/g], and still more preferably 20 to 80 [g/g]. The term "water-insoluble" means that the Ext (water-extractables) defined in ERT470.2-02 is usually 0% to 50% by weight, preferably 0% to 30% by weight, still more preferably 0% to 20% by weight, and particularly preferably 0% to 10% by weight.

The water absorbent resin can be appropriately designed in accordance with the application, and there are no particular limitations. However, the water absorbent resin is preferably a hydrophilic cross-linked polymer obtained by crosslinking polymerizing an unsaturated monomer having a carboxyl group. Furthermore, the water absorbent resin is not limited to the form the entire amount (100% by weight) of which is polymer, and the water absorbent resin may contain additives and the like as additional components other than the water absorbent resin, to the extent that the performance described above is maintained. That is, in the present invention, even a water absorbent resin composition is collectively referred to as a water absorbent resin. The content of a polyacrylic acid (salt)-type water absorbent resin is preferably 70% to 99.9% by weight, more preferably 80% to 99.7% by weight, and still more preferably 90% to 99.5% by weight, relative to the total amount. As the additional component other than the water absorbent resin, water is preferred from the viewpoints of the rate of water absorption and impact resistance of the powder (particles), and when necessary, the additives that are described below are included. Furthermore, the various forms that are discharged from the respective production steps are also included.

(1-2) "Polyacrylic Acid (Salt)"

The term "polyacrylic acid (salt)" according to the present invention refers to a polymer which contains an arbitrary graft component, and contains a main component of acrylic acid and/or a salt thereof (hereinafter, referred to as acrylic acid (salt)) as a repeating unit. Specifically, the polyacrylic acid (salt) refers to water absorbent resin which essentially contains acrylic acid (salt) at a proportion of 50% to 100% by mole among all the monomers used in polymerization (excluding the crosslinking agent), and preferably refers to a polymer which contains acrylic acid (salt) at a proportion of 70% to 100% by mole, more preferably 90% to 100% by mole, and particularly preferably substantially 100% by mole. Furthermore, the salt as a polymer essentially includes a water-soluble salt, and preferably includes a monovalent salt, still more preferably an acrylic metal salt or an ammonium salt, particularly preferably an alkali metal salt, and still more preferably a sodium salt.

(1-3) "EDANA" and "ERT"

The term "EDANA" is the abbreviation for the European Disposables and Nonwovens Association, and the term "ERT" is the abbreviation for a method for analyzing a water absorbent resin (EDANA Recommended Test Method), which is a European standard (almost international standard). Meanwhile, according to the present invention, unless particularly stated otherwise, the physical properties of a water absorbent resin are measured according to the original document of ERT (published document: revised in 2002).

(a) "CRC" (ERT441.2-02)

The term "CRC" is the abbreviation for Centrifuge Retention Capacity, and means absorption capacity without load (hereinafter, also be referred to as "water absorption capacity"). Specifically, the CRC is a water absorption capacity (unit: [g/g]) obtained after 0.2 g of a water absorbent resin in a non-woven fabric bag is allowed to freely swell for 30 minutes in a large excess of a 0.9 wt % aqueous solution of sodium chloride, and then is dehydrated in a centrifuge.

(b) "AAP" (ERT442.2-02)

The term "AAP" is the abbreviation for the Absorption Against Pressure, and means absorption capacity under load. Specifically, the AAP is the water absorption capacity under load (unit: [g/g]) obtained after allowing 0.9 g of a water absorbent resin to swell in a large excess of a 0.9 wt % aqueous solution of sodium chloride for one hour under a load of 2.06 kPa (0.3 psi, 21 [g/cm]). Meanwhile, according to the present invention, the measurement is made by changing the load conditions to 4.83 kPa (0.7 psi, 50 [g/cm]).

(c) "Ext" (ERT470.2-02)

The term "Ext" is the abbreviation for the Extractables, and means a water-extractables (amount of water-solubilized components). Specifically, the Ext is the value (unit: wt %) obtained by stirring 1 g of a water absorbent resin in 200 g of a 0.9 wt % aqueous solution of sodium chloride at 500 rpm for 16 hours, and then measuring the amount of dissolved polymer by pH titration.

(d) "Residual Monomers" (ERT410.2-02)

The term "Residual Monomers" means the amount of monomers remaining in a water absorbent resin. Specifically, the residual monomers is the value (unit: ppm) obtained by introducing 1.0 g of a water absorbent resin in 200 $cm^3$ of a 0.9 wt % aqueous solution of sodium chloride, stirring the mixture at 500 rpm for 1 hour, and then measuring the amount of residual monomers dissolved therein by High Performance Liquid Chromatography (HPLC).

(1-4) "Liquid Permeability"

The flow of liquid that flows between the particles of a swollen gel under a load or under no load is referred to as "liquid permeability." Representative measurement methods for this "liquid permeability" include Saline Flow Conductivity (SFC) and Gel Bed Permeability (GBP).

The term "Saline Flow Conductivity (SFC)" means the permeability of a 0.69 wt % aqueous solution of sodium chloride in 0.9 g of a water absorbent resin under a load of 0.3 psi. This is measured according to the SFC test method described in U.S. Pat. No. 5,669,894.

The term "gel bed permeability (GBP)" means the permeability of a 0.69 wt % aqueous solution of sodium chloride in a water absorbent resin under a load or under free swelling. This is measured according to the GBP test method described in WO 2005/016393.

(1-5) "Initial Color Tone and Coloration Over Time"

The term "initial color tone" according to the present invention means the color tone of a water absorbent resin immediately after manufacturing or a water absorbent resin immediately after user shipment, and usually, the initial color tone is controlled by the color tone before factory shipment. For the method for measuring the color tone, the methods described in US Patent Application Publication No. 2009/0275470 (Lab value, YI value, WB value, and the like) may be employed.

The "initial color tone" according to the present invention means the color tone of a water absorbent resin immediately after manufacturing or immediately after user shipment, and usually, the initial color tone is controlled by the color tone before factory shipment.

Furthermore, the term "coloration over time" means a change in the color tone of a water absorbent resin that occurs during long-term storage in an unused state, or at the time of distribution. Since a water absorbent resin undergoes coloration with a lapse of time, the product value of disposable diapers may decrease. Since coloration over time occurs for a period of several months to several years, the coloration over time is validated by the acceleration test (acceleration test under high temperature and high humidity atmosphere), which is disclosed in US Patent Application Publication No. 2009/0275470.

(1-6) "Colored Foreign Substances"

The "colored foreign substances" according to the present invention mean particles of different colors that are present in the water absorbent resin particles, and particularly mean colored particles of black color or brown color that are incorporated in a small amount into white particles. The colored foreign substances are disclosed in WO 2008/015946.

(1-7) "Filter"

The "filter" according to the present invention means a member (particularly, cloth, honeycomb, slit, or net) having a function of collecting or separating a solid (particularly, a water absorbent resin) that is dispersed in liquid or gas (particularly, hot air). Therefore, a member which laminates a water absorbent resin or a water-containing gel as necessary (for example, a wire mesh or a punching metal) does not correspond to the filter of the present invention.

(1-8) Others

According to the present specification, the expression "X to Y" that indicates a range means "equal to or more than X and equal to or less than Y." Furthermore, the unit of weight, "t (ton)", means "metric ton", and unless particularly stated otherwise, the unit "ppm" means "ppm by weight" or "ppm by mass". Furthermore, according to the present specification, "mass" and "weight", "% by mass" and "% by weight", and "parts by mass" and "parts by weight" are synonyms, and in regard to the measurement of physical properties and the like, measurement is made at room temperature (20° C. to 25° C.)/relative humidity 40% to 50% unless particularly stated otherwise. Furthermore, the term "-acid (salt)" means "-acid and/or a salt thereof", and "(meth)acryl" means "acryl and/or methacryl".

[2] DESCRIPTION OF PRESENT INVENTION

Aerating Apparatus for High Temperature Gas Stream

The present invention provides a method for producing a particulate water absorbent resin, which includes a step of polymerizing an aqueous solution of an unsaturated monomer; and a step of drying a particulate water-containing gel-like cross-linked polymer having a solids concentration of 30% by weight or greater that is obtainable in a gel grain refining step during polymerization or after polymerization, with one or more apparatuses for aerating a water absorbent resin with a high temperature gas stream being installed in the drying step and/or in at least one of the subsequent steps, wherein in the aerating apparatus, the high temperature gas stream is passed through a filter and then is reused in the same step as the step where the aerating apparatus is installed, or in a different step (first production method). Meanwhile, the phrase "aerating the water absorbent resin with a high temperature gas stream" means "aerating the particulate water-containing gel-like cross-linked polymer or a water absorbent resin, which is a dried product of the particulate water-containing gel-like cross-linked polymer, with a high temperature gas stream."

That is, the present invention is a method for producing a particulate water absorbent resin, which involves one or two or more of an apparatus for aerating a water absorbent resin (including a particulate water-containing gel-like cross-linked polymer (hereinafter, referred to as "polymer gel"), and a dried product, a pulverization product and a classification product of the cross-linked polymer) with a high temperature gas stream, in which in at least one step, a portion or the entirety of the high temperature gas stream used to aerate the water absorbent resin is passed through a filter that collects the "water absorbent resin particles or a water-containing gel thereof" contained in the high temperature gas stream, and then is reused in the same step as the step where the aerating apparatus is installed, or in a different step.

Meanwhile, the "water absorbent resin particles or a water-containing gel thereof" refers to the water absorbent resin contained in the high temperature gas stream, and the solids concentration of the water absorbent resin sequentially changes in the gas stream. Usually, a material having a solids concentration of 80% by weight or greater, even 85% by weight or greater, or particularly 90% by weight or greater, is called water absorbent resin particles, while a material having a solids concentration of less than 80% by weight is called a water-containing gel. However, in the present invention, clear distinguishment between water absorbent resin particles and a water-containing gel is not a significant issue. Therefore, hereinafter, the "water absorbent resin particles or a water-containing gel thereof" will be collectively referred to as "a water-containing gel."

The inventors of the present invention found that when a high temperature gas stream (for example, a gas stream at 100° C. to 250° C. as will be described below) is reused for aeration of the water absorbent resin in a drying step, the water-containing gel contained in the high temperature gas stream is colored as a result of long-term retention or attachment of the water-containing gel in the drying step system, a portion of the colored water-containing gel is incorporated into the water absorbent resin discharged in a conventional drying time, and as a result, deterioration of the color tone of the water absorbent resin is caused, while the water-containing gel adheres to the heat exchanger, causing a decrease in the thermal efficiency over time. Furthermore, it was found that the problem described above becomes more noticeable in a polymer gel having a high solids concentration, and the problem becomes more serious as the solids concentration increases in an order of 30% by weight or greater, 35% by weight or greater, 40% by weight or greater, 45% by weight or greater, 50% by weight or greater, 55% by weight or greater, and 60% by weight or greater. However, the present invention can be preferably applied to polymer gels having these high solids concentrations. Meanwhile, when the particulate water-containing gel-like cross-linked polymer (polymer gel) is a mixture of polymers with different solids concentrations in the drying step (for example, in the case of drying a mixture of water-containing gels having different solids concentrations, or a mixture of a water-containing gel and a dried product), or even when the solids concentration of the particulate water-containing gel-like cross-linked polymer (polymer gel) can be increased by evaporation of water, addition of a fine powder of the water absorbent resin or the like in the polymerization step, the problem becomes more serious. However, the present invention can be preferably applied thereto.

As for the solids concentration of the polymer gel, the upper limit is not limited as long as the polymer gel is a water-containing gel, but the solids concentration is preferably 80% by weight or less, more preferably less than 80% by weight, still more preferably 75% by weight or less, and particularly preferably 70% by weight or less. If the solids concentration is less than 30% by weight, not only the productivity of the water absorbent resin deteriorates, but also the characteristic effect of the present invention is not easily exhibited. On the other hand, if the solids concentration is greater than 80% by weight and excessively high, there is a risk that the water absorption performance such as the water absorption capacity may decrease. The solids concentration is determined by the concentration of monomers at the time of polymerization, evaporation at the time of polymerization, and if necessary, the additives that are added during polymerization or after polymerization. However, the solids concentration can also be controlled by adding a fine powder of the water absorbent resin or a hydrogenation product thereof as an additive.

(a) Aerating Apparatus for High Temperature Gas Stream

In the production method according to the present invention, it is essential that the method uses one or two or more apparatuses for aerating a water absorbent resin (including a polymer gel and a dried product, a pulverization product and a classification product of the polymer gel) with a high temperature gas stream. Examples of the step that is to be provided with the aerating apparatus include a step for drying the particulate water-containing gel-like cross-linked polymer (polymer gel), a pulverization step for pulverizing the dried product obtained after drying, a classification step for classifying the pulverization product obtained after pulverization, and a surface crosslinking step for crosslinking the surface of a water absorbent resin powder obtained in the classification step. Among them, a drying step and a surface crosslinking step are preferred, and a drying step is particularly preferred. Furthermore, the aerating apparatus is preferably a ventilated dryer as will be described in detail below. Particularly, it is preferable that the aerating apparatus be a ventilated dryer, particularly a ventilated band dryer, used in a drying step.

Figure 2:
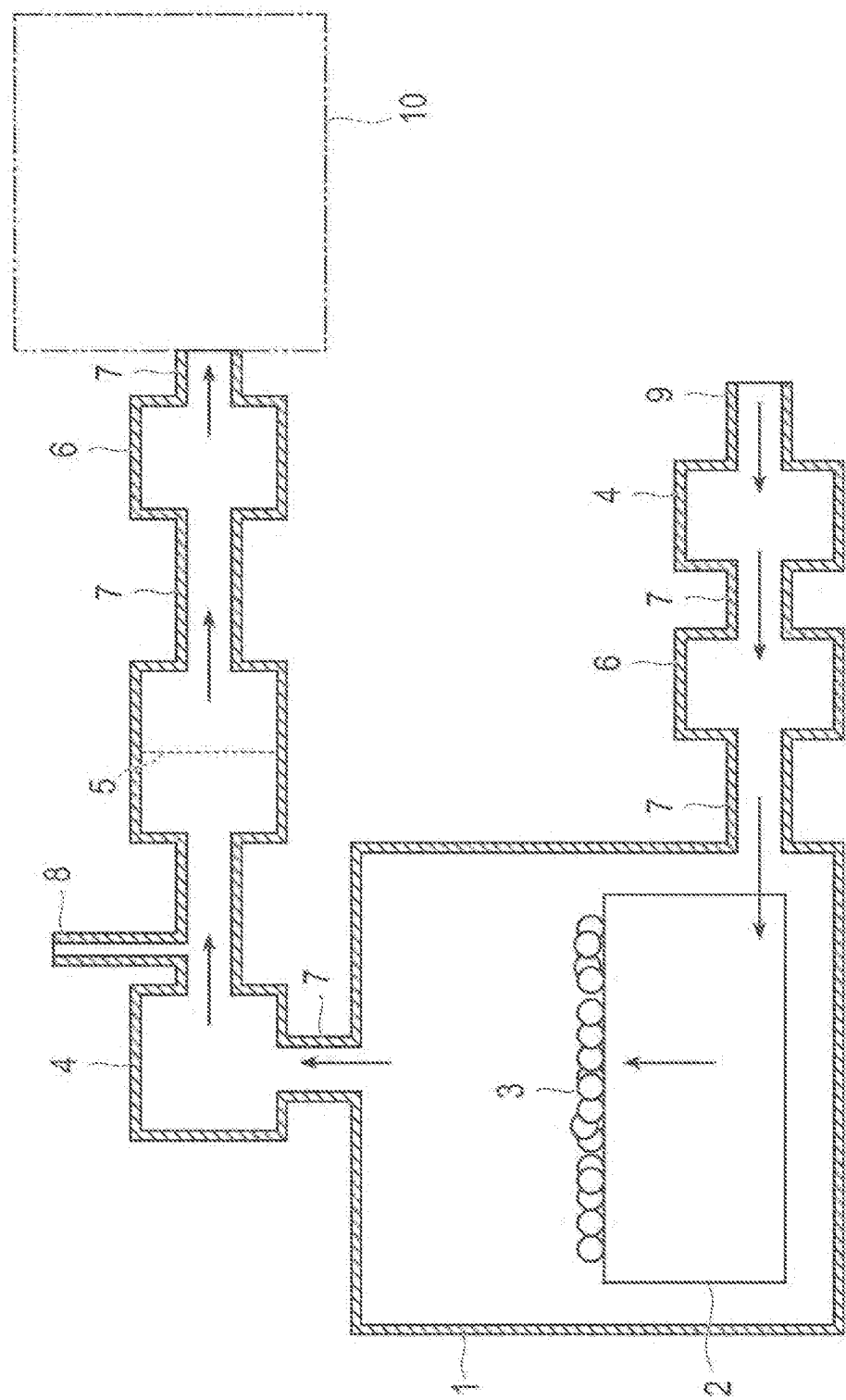
FIG. 2 is a schematic diagram illustrating another exemplary embodiment of the present invention.

The aerating apparatus for a high temperature gas stream (hot air) used in the present invention is not particularly limited as long as the aerating apparatus includes a blower, a heat exchanger, a filter, and piping that connects these members, as illustrated in FIG. 1. Furthermore, the specifications of the various devices are appropriately selected and determined to the extent that a high temperature gas stream having a temperature, amount of gas flow and the like such as described below may be obtained. Furthermore, in the case of reusing the high temperature gas stream in separate steps, although not particularly limited, an apparatus such as illustrated in FIG. 2 is preferably employed.

Figure 3:
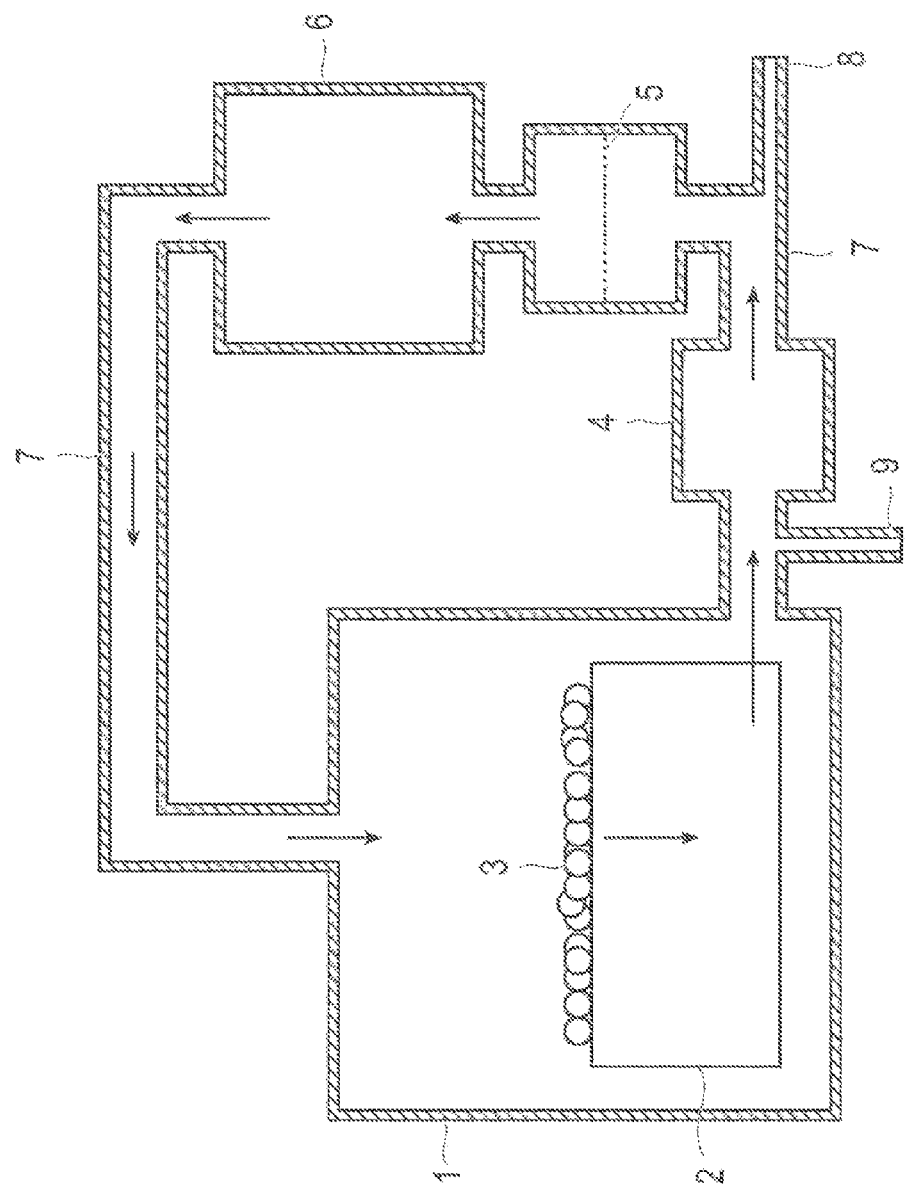
FIG. 3 is a schematic diagram illustrating still another exemplary embodiment of the present invention.

Hereinafter, the embodiment in which an aerating apparatus is installed in a drying step will be described with reference to FIG. 1. However, the present invention is not intended to be limited to the following embodiment, and can also be applied similarly to other steps. In FIG. 1, a gas stream is allowed to flow into a hot air dryer 1 as an aerating apparatus (ventilated chamber), and the gas stream is preliminarily heated to a determined temperature. Subsequently, a particulate water-containing gel-like polymer (polymer gel) 3 that has been adjusted to have a predetermined solids concentration is loaded on a belt conveyor 2, and the high temperature gas stream is blown upward to the polymer gel to aerate the polymer gel. The high temperature gas stream after aeration is treated, by means of a blower 4, such that a portion of the gas stream is discharged out of the system through a gas exhaust pipe 8, while the remaining portion of gas is passed through a filter 5. Thereby, water absorbent resin particles or a water-containing gel thereof, which has a risk of causing color deterioration of manufactured products, can be removed from the high temperature gas stream. Meanwhile, in the present embodiment, the discharge of a portion of the gas may be carried out after the gas passes through the filter 5. The gas that has passed through the filter 5 is reheated to a predetermined temperature in a heat exchanger 6, and then is reused in the hot air dryer 1. Furthermore, FIG. 3 illustrates another embodiment in which the high temperature gas stream flows in an opposite direction to that shown in FIG. 1. That is, in FIG. 3, the gas stream is allowed to flow into the hot air dryer 1 as an aerating apparatus (ventilated chamber), and the gas stream is preliminarily heated to a predetermined temperature. Subsequently, a particulate water-containing gel-like polymer (polymer gel) 3 that has been adjusted to have a predetermined solids concentration is loaded on a belt conveyor 2, and the high temperature gas stream is blown downward to the polymer gel to aerate the polymer gel. The high temperature gas stream after aeration is treated, by means of a blower 4, such that a portion of the gas stream is discharged out of the system through a gas exhaust pipe 8, while the remaining portion of the gas is passed through a filter 5. Thereby, water absorbent resin particles or a water-containing gel thereof, which has a risk of causing color deterioration of manufactured products, can be removed from the high temperature gas stream. Meanwhile, in the present embodiment, the discharge of a portion of the gas may be carried out after the gas passes through the filter 5. The gas that has passed through the filter 5 is reheated to a predetermined temperature in a heat exchanger 6, and then is reused in the hot air dryer 1.

In the present invention, the high temperature gas stream is preferably reheated, but in the case of reheating the gas stream, a filter is installed after the reheating and/or before the reheating of the high temperature gas stream. Here, the order of installation of the filter and the hot air dryer may be such that the gas may be passed through the filter and then reheated in the heat exchanger as described above, the gas may be reheated in the heat exchanger and then passed through the filter, or as a combination of the two, the filter may be installed at plural different sites (particularly, at two sites; more particularly, before and after the reheating). However, at least, in consideration of the fact that the water-containing gel does not adhere to the heat exchanger, it is preferable to pass the gas through the filter and then to reheat the gas in the heat exchanger. That is, it is preferable that the passage of the high temperature gas stream through the filter be carried out before the reheating of the high temperature gas stream that is used for the aeration of the water absorbent resin. Furthermore, preferably, it is preferable to pass the high temperature gas stream through a filter (preferably, a wire mesh or a grid plate, and particularly preferably, a grid plate) even after the reheating.

Meanwhile, in the case of installing a filter after the reheating in the present invention, when upward ventilation is carried out to the water-containing gel on the dryer, the filter (preferably, a grid plate) may be installed horizontally or quasi-horizontally (an angle of inclination of 45° or less) below the dryer. On the other hand, when downward ventilation is carried out to the water-containing gel on the dryer, the filter (preferably, a grid plate) may be installed horizontally or quasi-horizontally (an angle of inclination of 45° or less) above the dryer. Through such installation of a filter after reheating and/or before reheating, particularly after reheating, not only the incorporation of colored foreign substances can be prevented, but also uniform drying, particularly uniform drying of the water-containing gel that is laminated to be dried by ventilation, is enabled, so that the physical properties and productivity are also enhanced.

Alternatively, as illustrated in FIG. 2, the gas that has passed through the filter 5 is reheated to a predetermined temperature in the heat exchanger 6, and then may be reused in other steps 10 (for example, a step of drying another particulate water-containing gel-like cross-linked polymer (polymer gel), a pulverization step of pulverizing the dried product obtained after drying, a classification step of classifying the pulverization product obtained after pulverization, and a surface crosslinking step of crosslinking the surface of a water absorbent resin powder obtained in the classification step).

The temperature of the high temperature gas stream is preferably 100° C. to 250° C., and is more preferably, in the following sequence, 100° C. to 220° C., 120° C. to 220° C., 140° C. to 220° C., and 150° C. or 190° C. If the temperature is lower than 100° C., the water absorption capacity after drying or the rate of water absorption may decrease, a predetermined drying efficiency may not be obtained, or there is a possibility that the surface crosslinking reaction may not proceed. On the other hand, if the temperature is higher than 250° C., desired water absorption performance may not be obtained, and there is a risk that the entire water absorbent resin may be colored. Meanwhile, when an aerating apparatus for the high temperature gas stream of the present invention is installed in a drying step, the temperature of the high temperature gas stream is adjusted to be equal to the drying temperature in the drying step, and when the apparatus is installed in a surface crosslinking step, the temperature of the high temperature gas stream is adjusted to be equal to the heat treatment temperature.

The flow rate (flow velocity) of the high temperature gas stream is preferably 0.1 to 5 [m/s], more preferably 0.5 to 3 [m/s], 1.0 to 2.9 [m/s], or 1.2 to 2.8 [m/s]. If the flow velocity is less than 0.1 [m/s], for example, in the case of installing an aerating apparatus in the drying step, there is a risk that the rate of water absorption after drying may be decreased, or a predetermined drying efficiency may not be obtained. Furthermore, in the case of installing an aerating apparatus in the surface crosslinking step of crosslinking the surface of a water absorbent resin powder, there is a risk that the surface crosslinking reaction may not occur. On the other hand, if the flow velocity is greater than 5 [m/s], there is a risk that the water absorbent resin may scatter excessively, causing a decrease in the yield. The high temperature gas stream is usually air, but the high temperature gas stream may contain an inert gas such as nitrogen or argon, or water vapor in an amount of 80% by volume or greater. Furthermore, the high temperature gas stream may be directed upward or downward with respect to the water absorbent resin that is to be aerated, or the flow directions may be alternately used in combination. However, it is preferable that the flow direction be at least partially (particularly preferably, first half) upward. When aeration is carried out in the upward direction, gaps between the water absorbent resin particles are maintained so that the high temperature gas stream easily passes therebetween, and satisfactory drying efficiency and/or heating efficiency are obtained. On the other hand, when aeration is carried out in the downward direction, the water absorbent resin is pressed down, so that the gaps between the particles are reduced, and it may be difficult for the high temperature gas stream to pass between the particles.

(b) Reuse of High Temperature Gas Stream

In the production method according to the present invention, it is essential to aerate the water absorbent resin (including a polymer gel, and a dried product, a pulverization product and a classification product of the polymer gel) with a high temperature gas stream, and then to reuse a portion or the entirety of the high temperature gas stream. The high temperature gas stream is such that usually, hot air is used as a heat medium, and even after the high temperature gas stream is used to aerate the water absorbent resin, the high temperature gas stream has a temperature higher than normal temperature. Therefore, from the viewpoint of the energy efficiency, a portion or the entirety of the high temperature gas stream is circulated and reused. Furthermore, since the moisture evaporated from the water absorbent resin is included in the high temperature gas stream, and a gas having a high-dew point is obtained, the residual monomers of the particulate water absorbent resin thus obtainable may be reduced, and the a water absorbent resin having excellent water absorption characteristics may be obtained. In regard to the reuse of such a gas stream, a method of circulating hot air is generally used. Meanwhile, when a high temperature gas stream is reused in the same step as the step in which the aerating apparatus is installed, this may be called "circulation."

Furthermore, from the viewpoint of the drying efficiency or reduced coloration, the high temperature gas stream obtained after aerating the water absorbent resin may be circulated (reused) in the same step or may be reused in different steps. However, it is preferable to reuse the high temperature gas stream in a step of heating by using hot air as a heat medium, and specifically, it is preferable to reuse the high temperature gas stream in the drying step or the surface crosslinking step. Furthermore, it is preferable that a portion of the high temperature gas stream be discharged out of the system, and the heat energy from the gas stream thus discharged be recycled. Meanwhile, the circulation rate (circulation rate of the high temperature gas stream) in the case of circulating (reusing) the high temperature gas stream in the same step may be appropriately determined depending on the step in which the ventilating apparatus is provided or the like, and although not particularly limited, the circulation ratio is preferably 50% to 99.99%, more preferably 80% to 99.5%, and still more preferably 90% to 99%. The circulation rate of the high temperature gas stream is defined by the following formula. Meanwhile, the volume of the gas is adjusted to the standard volume.

Circulation ratio of high temperature gas stream [%]=
[1−(Total amount of high temperature gas stream discharged out of system [m$^3$])/(Total amount of high temperature gas stream used for aeration of water absorbent resin [m$^3$])]×100     [Mathematical Formula 1]

(c) Reheating of High Temperature Gas Stream

In the production method according to the present invention, it is preferable to heat the high temperature gas stream before reusing the gas stream. The method of heating is not particularly limited, but heating is usually carried out by using a heat exchanger, and preferably, from the viewpoint of energy saving, waste heat from the hot air dryer or other steps, or from plants (particularly, a plant for acrylic acid production) can be utilized. Furthermore, the temperature and the like of the high temperature gas stream are controlled in accordance with the step of reusing the high temperature gas stream. Here, the temperature of the high temperature gas stream is not particularly limited, and the temperature is preferably a temperature defined by the step of reusing the high temperature gas stream (for example, a drying step and a surface crosslinking step). Specifically, the temperature at the time of reuse of the high temperature gas stream is preferably 100° C. to 250° C., and is more preferably in the range described above.

Furthermore, a fresh gas may be taken in before the heating, and may be mixed with the gas to be reused. In this case, it is preferable to incorporate the fresh gas at a proportion of 0.01 to 10 times the standard volume relative to 1 standard volume of the gas to be reused. Here, the fresh gas is not particularly limited, but usually, it is preferable to use the same gas as the gas to be reused. For example, the fresh gas is usually air, but may contain 80% by volume or more of an inert gas such as nitrogen and argon, water vapor, or the like.

(d) Water-Containing Gel Captured on Filter

According to the present invention, a member (particularly, cloth, honeycomb, slit or net) having a functional of collecting or separating a solid (particularly, a water absorbent resin) that is dispersed in liquid or gas (particularly, hot air) is used as a filter. Furthermore, the flow of the high temperature gas stream may be arranged through the filter. Meanwhile, according to the present invention, a wire mesh or a grid plate (punching metal), which laminates the polymer gel in a band dryer or the like, is not included in the filter. That is, in contradiction to the wire mesh or grid plate for laminating the polymer gel in a band dryer or the like, the filter according to the present invention is a member (particularly, cloth, honeycomb, slit, or net) that is installed in a place which is substantially not brought into contact with the polymer gel or the water absorbent resin that is dried or heated. Meanwhile, the honeycomb is a filter having a broad three-dimensional shape which is not limited to a regular hexagonal prism shape, but includes rectangular hexahedrons, cuboids and the like.

The inventors of the present invention found that in regard to the coloration of the water absorbent resin or a decrease in the drying efficiency in the drying step using a band dryer, the water-containing gel contained in the high temperature gas stream, which has not been hitherto taken into consideration, causes the problems described above. That is, since the water-containing gel contained in the high temperature gas stream is carried adrift on the gas stream, and is heated simultaneously when the gas is reheated, the water-containing gel is colored. Furthermore, the colored water-containing gel is incorporated into a normal water absorbent resin, and causes color deterioration of the product thus obtainable. Furthermore, in the case of drying the water-containing gel by using a continuous fluidized bed dryer, sufficient piston flow properties are not exhibited, and consequently, the water-containing gel is retained for a long time, so that the water absorbent resin may be colored. From this point of view, when the high temperature gas stream is reused, it is preferable to pass the high temperature gas stream through a filter before reheating, and to remove the water-containing gel contained in the high temperature gas stream. Furthermore, the apparatus for aerating the water absorbent resin with a high temperature gas stream (aerating apparatus) according to the present invention may further include an apparatus which removes the water absorbent resin particles or a water-containing gel thereof contained in the high temperature gas stream before reheating the high temperature gas stream. Here, the apparatus is not particularly limited as long as it is capable of removing the water absorbent resin particles or a water-containing gel thereof contained in the high temperature gas stream, and for example, the filter according to the present invention can be used in the same manner or after being appropriately modified.

According to the present invention, the particle size of the water-containing gel that is collected is preferably greater than or equal to 150 μm and less than 850 μm, which is a preferred particle size for manufactured goods. When a water-containing gel having a particle size in the range described above is collected, a water-containing gel having a particle size of 850 μm or greater is also collected, but since the amount of scattering is small, this does not cause a particular problem. On the other hand, a water-containing gel having a particle size of less than 150 μm is not collected and passes through a filter, but even if these particles are colored and incorporated into a normal water absorbent resin, the particles are not recognizable as foreign substances. Rather, if it is attempted to collect these particles on the contrary, it is not preferable because the pressure loss of the gas stream becomes large. Meanwhile, the collection of the water-containing gel having a particle size of greater than or equal to 150 μm and less than 850 μm is not limited to the use of a wire mesh or punching metal having such a mesh size, and since even a wire mesh or punching metal having a mesh size of 850 μm or greater can appropriately collect the water-containing gel through collection at non-opening areas or through adhesion, a wire mesh or punching metal having a mesh size of 50 mm or less, 30 mm or less, or 10 mm or less (the lower limit is, for example, 150 μm, or 300 μm) is used.

The amount of collection of the water-containing gel having a particle size of greater than or equal to 150 μm and less than 850 μm is 30% by weight or greater of the total amount of collection, and preferably, the filter may be installed such that the amount of collection would be 50% by weight or greater, and more preferably 70% by weight or greater. Furthermore, the upper limit of the amount of collection of the water-containing gel having a particle size of greater than or equal to 150 μm and less than 850 μm is not particularly limited and is 100% by weight of the total amount of collection; however, an amount of about 90% by weight is sufficient.

Furthermore, the amount of collection of the water absorbent resin or a water-containing gel thereof that is captured on the filter is not particularly limited, but the amount of collection is preferably greater than 0% by weight and less than 0.1% by weight, more preferably 0.05% by weight or less, and still more preferably less than 0.05% by weight (the lower limit is 0.0001% by weight) relative to the production output (dried product) of the water absorbent resin. Meanwhile, the water-containing gel captured on the filter is preferably discarded. Here, the "production output of the water absorbent resin" means the production output (weight in terms of dried product) of the water absorbent resin as a final product. Meanwhile, the water absorbent resin or a water-containing gel thereof that is captured on the filter is desirably removed frequently from the filter.

When the amount of collection relative to the production output of the water absorbent resin is 0.1% by weight or greater, a decrease in the yield may occur, and also, the water absorption performance of the particulate water absorbent resin thus obtainable may deteriorate. Therefore, it is preferable to optimize the temperature or flow velocity of the high temperature gas stream that is used to aerate the water absorbent resin, or the state of the water absorbent resin (thickness of the layer or the general conditions of the apparatus), and to reduce the amount of scattering of the water-containing gel.

(e) Mesh Size of Filter

In the production method according to the present invention, so long as the filter is capable of collecting or separating solids (particularly, the water absorbent resin or a water-containing gel thereof), the member of the filter is not particularly limited; however, the member may be a woven fabric, a non-woven fabric, a honeycomb, a net (particularly, a wire mesh), a slit (particularly, a grid plate), or a combination thereof. Although there are no particular limitations, a net (particularly, a wire mesh) or a slit (a grid plate) is preferred, while a grid plate is more preferred. When a net or a slit is used as the filter, the mesh size of the filter for collecting the water-containing gel contained in the high temperature gas stream is preferably the mesh size described above in the section (d) (preferably, 50 mm or less), and/or the area of opening per hole is preferably 0.01 $mm^2$ to 500 $mm^2$ (50 $mm^2$). More preferably, the mesh size (area of opening per hole) of the filter is 0.02 $mm^2$ to 10 $mm^2$, and still more preferably 0.03 $mm^2$ to 1 $mm^2$. According to the present invention, the mesh size of the filter when filters are installed after the reheating and/or before the reheating of the high temperature gas stream may be identical or different. Preferably, a filter having a small mesh size (for example, 0.01 $mm^2$ to 50 $mm^2$, 0.02 $mm^2$ to 10 $mm^2$, and particularly 0.03 $mm^2$ to 1 $mm^2$) is used before the reheating. Furthermore, it is preferable to use a filter having a large mesh size (for example, 0.1 $mm^2$ to 500 $mm^2$, 2 $mm^2$ to 100 $mm^2$, and particularly 3 $mm^2$ to 50 $mm^2$) after the reheating. If this area of opening is less than 0.01 $mm^2$, since the water-containing gel is likely to cause clogging, the pressure loss of the gas stream may become large. On the other hand, if the area of opening is greater than 500 $mm^2$ or 50 $mm^2$, most of the water-containing gel may not be captured. Furthermore, the shape of the hole is not particularly limited, but a circular shape or a square shape is preferred. The ratio of opening area is 1% to 70% of the total area of the filter, and is preferably 2% to 65%, and more preferably, in sequence, 3% to 60%, 15% to 50%, 20% to 50%, 20% to 45%, and 25% to 40%. Meanwhile, the ratio of opening area is determined based on the hole, pitch or the like, but in the case where the filter does not have any holes in certain areas, for example, when a punching metal has a "rim", the opening area is defined as an area which also includes that part. If the ratio of opening area is less than 1%, the pressure loss of the gas stream may become large, and on the other hand, if the ratio of opening area is greater than 70%, there may be a problem with the filter strength. Meanwhile, plural filters may be installed as necessary, and the high temperature gas stream may be passed through different filters at plural sites. Preferably, with regard to the filter, plural filters, for example, 2 to 4 sheets of filters are used in the same drying step (same drying chamber), and it is desirable to pass hot air through filters before the reheating and after the reheating, and to dry the water-containing gel with the hot air. Furthermore, in the case of installing filters at plural sites, it is preferable to install filters before and after the reheating, and the shape or mesh size of the filters may be identical or may be different. However, preferably, when different filters, particularly a wire mesh and a grid plate, are used in combination, or filters having different mesh sizes (particularly, 2 to 100 times, or 3 to 50 times) are used in combination before and after the reheating, prevention of incorporation of foreign substances, prevention of coloration, and uniform drying can be achieved, which is preferable. Furthermore, when plural sheets are installed, the respective opening areas of the filters may be identical with or different from one another.

(f) Material of Filter

According to the present invention, the temperature of the high temperature gas stream when the gas stream passes through the filter is preferably 60° C. to 250° C., and more preferably 100° C. to 180° C. Therefore, the material of the filter is not particularly limited as long as the material has durability at the temperature described above, but preferred examples include metals, organic fibers, inorganic fibers, ceramics and the like. Specific examples of the metals include stainless steel, iron, aluminum and the like. Furthermore, examples of the shape of the filter include honeycomb (three-dimensional shape), a mesh, and a punched plate, and particularly, a mesh or punching metal made of stainless steel is preferred.

The shape of the hole of the punching metal is not particularly limited, and examples include a circular hole, an elliptical hole, a square hole, a hexagonal hole, an oval hole, a rectangular hole, a rhombic hole, and a cross hole, or combinations of plural shapes of these may also be used. Furthermore, the method of arrangement of the holes is also not particularly limited, and for example, the holes may be arranged in zigzags or in parallel. Furthermore, the holes may also be sterically formed such as in the form of louver (bay window), but preferably, the punching metal has holes having a planar structure, particularly circular holes. Also, the pitch direction may be a longitudinal direction, a transverse direction or an oblique direction, and combinations of these may also be used.

(g) Prevention of Pressure Loss Due to Filter

According to the present invention, the diameter of the pipes through which the high temperature gas stream passes may be determined by considering the pressure loss and the space of installation. Meanwhile, in order to reduce the pressure loss, the high temperature gas stream is preferably at a low velocity, and specifically, it is preferable that the flow velocity at the time of passage through the filter (cross-sectional flow velocity=volume of gas flow/cross-sectional area of filter) be 0.1 to 5 [m/s]. In order to reduce the flow velocity when the high temperature gas stream passes through the filter, it is preferable to enlarge the diameter of the site of installation of the filter, and to increase the area of the filter.

(h) Prevention of Filter Clogging

From the viewpoint of preventing clogging of the filter, the direction of the high temperature gas stream that passes through the filter is preferably a direction other than the downward direction, and more preferably a direction that deviates by 45° or more from the vertical downward direction. Meanwhile, when the high temperature gas stream passes downward through the filter, it is not preferable because the water-containing gel is likely to deposit on the filter and cause clogging. Furthermore, there is an available method of preventing deposition of the water-containing gel by inclining the filter, or subjecting the filter to vibration.

[3] METHOD FOR PRODUCING WATER ABSORBENT RESIN (3-1) Aqueous Solution of Unsaturated Monomers (a) Monomers The unsaturated monomer that can be used in the present invention may be acrylic acid alone, combined use of acrylic acid and a monomer other than acrylic acid, or a single monomer other than acrylic acid. Among these, from the viewpoint of the physical properties of the water absorbent resin (water absorption capacity, water-extractables, residual monomers, liquid permeability, and the like), an aqueous solution containing acrylic acid and/or a salt thereof (hereinafter, referred to as "acrylic acid (salt)") as a main component is preferred. The monomer concentration in the aqueous monomer solution is usually 10% to 90% by weight, preferably 20% to 80% by weight, more preferably 30% to 70% by weight, and still more preferably 30% to 60% by weight.

Furthermore, the polymer gel obtainable by polymerization of the aqueous solution is preferably such that, from the viewpoint of the water absorption performance, at least a portion of the acid groups of the polymer be neutralized. The neutralization can be carried out before polymerization, during polymerization or after polymerization of acrylic acid, but from the viewpoints of productivity of the water absorbent resin, and an enhancement of AAP (absorption against pressure) or SFC (saline flow conductivity), it is preferable to perform neutralization before the polymerization of acrylic acid. That is, it is preferable to use neutralized acrylic acid (that is, partially neutralized salt of acrylic acid) as a monomer. Here, examples of the salt of acrylic acid essentially include water-soluble salts, and the salt preferably includes a monovalent salt, more preferably an acrylic metal salt or an ammonium salt, particularly preferably an alkali metal salt, and still more preferably a sodium salt.

The neutralization ratio of the neutralization described above is not particularly limited, but the neutralization ratio is preferably 10% to 100% by mole, more preferably 20% to 100% by mole, still more preferably 50% to 99% by mole, and particularly preferably 60% to 90% by mole. If the neutralization ratio is less than 10% by mole, the CRC (absorption capacity without load) in particular may be markedly decreased, which is not preferable.

Furthermore, there are no particular limitations on monomers other than acrylic acid (hereinafter, also referred to as "other monomer"), but examples thereof include methacrylic acid, maleic acid (anhydride), 2-(meth)acrylamido-2-methylpropanesulfonic acid, (meth)acryloxyalkanesulfonic acid, N-vinyl-2-pyrrolidone, N-vinylacetamide, (meth)acrylamide, N-isopropyl(meth)acrylamide, N,N-dimethyl(meth)

acrylamide, 2-hydroxyethyl(meth)acrylate, methoxypolyethylene glycol(meth)acrylate, polyethylene glycol(meth)acrylate, stearyl acrylate, and salts thereof. When these other monomers are used, the using amount is determined in accordance with the purpose or function and is not particularly limited, but the using amount is preferably 0% to 50% by weight, and more preferably 0% to 20% by weight, relative to the total weight of all monomers.

In the present invention, from the viewpoint of polymerization stability, it is preferable that a polymerization inhibitor, particularly a methoxyphenol compound, be included in the monomers, and it is more preferable that p-methoxyphenol (commonly called methoquinone) be included. The using amount of the polymerization inhibitor is preferably 1 ppm to 1,000 ppm, more preferably 1 ppm to 250 ppm (on a weight basis; hereinafter, the same), still more preferably 5 ppm to 200 ppm, particularly preferably 10 ppm to 160 ppm, and most preferably 20 ppm to 100 ppm, relative to the monomers. If the using amount of the polymerization inhibitor is less than 1 ppm, there is a risk that unexpected polymerization may occur, and on the other hand, if the using amount is greater than 1,000 ppm, there is a risk that coloration of the water absorbent resin may become a problem.

In the present invention, from the viewpoints of coloration of the water absorbent resin and the rate of polymerization, it is preferable that iron ions as an iron component be included in the monomers or the aqueous monomer solution. The content of iron ions is preferably greater than 0 ppm and greater than or equal to 10 ppm in terms of $Fe_2O_3$, more preferably greater than 0 ppm and greater than or equal to 5 ppm, still more preferably 0.001 ppm to 5 ppm, particularly preferably 0.001 ppm to 4 ppm, and most preferably 0.005 ppm to 3 ppm, relative to the monomers. The content of iron ions is greater than 10 ppm, coloration of the water absorbent resin may be observed. On the other hand, if the content of iron ions is adjusted to N.D. (below the detection limit; usually, 0 ppm), even though an enormous cost is expended, an effect appropriate for the cost may not be obtained, and also, there is a risk that in redox polymerization or the like, the rate of polymerization may be decreased.

Furthermore, among the six kinds of impurities such as protoanemonin, allyl acrylate, allyl alcohol, aldehyde components (particularly, furfural), maleic acid and benzoic acid in acrylic acid, one or more, two or more, three or more, four or more, five or more, or six of the impurities are each contained in an amount of 0 ppm to 20 ppm (on a mass basis; hereinafter, the same), preferably 0 ppm to 10 ppm, more preferably 0 ppm to 5 ppm, still more preferably 0 ppm to 3 ppm, particularly preferably 0 ppm to 1 ppm, and most preferably N.D. (detection limit). Furthermore, the total amount of these protoanemonin, allyl acrylate, allyl alcohol, aldehyde components, maleic acid and benzoic acid is preferably 100 ppm or less, more preferably 0 ppm to 20 ppm, and still more preferably 0 ppm to 10 ppm, relative to acrylic acid. Furthermore, from the viewpoint of reducing residual monomers, the content of acrylic acid dimer is preferably 0 ppm to 500 ppm, more preferably 0 ppm to 200 ppm, and particularly preferably 0 ppm to 100 ppm.

(b) Crosslinking Agent

According to the present invention, from the viewpoint of the water absorption performance of the water absorbent resin thus obtainable, it is particularly preferable to use a crosslinking agent (hereinafter, also referred to as "internal crosslinking agent"). There are no particular limitations on the internal crosslinking agent that can be used, and examples thereof include a polymerizable crosslinking agent capable of polymerizing with acrylic acid, a reactive crosslinking agent capable of reacting with a carboxyl group, and a crosslinking agent combining these. Specific examples include, as polymerizable crosslinking agents, compounds having at least two polymerizable double bonds in the molecule, such as N,N'-methylenebisacrylamide, (poly)ethylene glycol di(meth)acrylate, (polyoxyethylene)trimethylolpropane tri(meth)acrylate, and poly(meth)allyloxyalkane. Furthermore, examples of the reactive crosslinking agent include polyglycidyl ethers such as ethylene glycol diglycidyl ether; crosslinking agents capable of covalent bonding, such as polyhydric alcohols such as propanediol, glycerin, and sorbitol; and crosslinking agents capable of ionic bonding, such as polyvalent metal compounds such as aluminum salts. Among these, from the viewpoint of water absorption performance, polymerizable crosslinking agents capable of polymerizing with acrylic acid are preferred, and particularly, acrylate-type, allyl-type and acrylamide-type polymerizable crosslinking agents are suitably used. These internal crosslinking agents may be used singly, or two or more kinds may be used in combination. In the view of the physical properties, the using amount of the internal crosslinking agent is preferably 0.0001% to 5% by mole, and more preferably 0.0005% to 2% by mole, of the monomers described above excluding crosslinking agents. Furthermore, the internal crosslinking agent may be added to the aqueous monomer solution before polymerization or may be added to the water-containing gel during polymerization or after polymerization, or two of these may be used in combination. However, it is preferable to add the internal crosslinking agent to the aqueous monomer solution.

(c) Other Components in Aqueous Monomer Solution

In order to improve the various physical properties of the particulate water absorbent resin obtainable by the present invention, the following substances can be added to the aqueous monomer solution as optional components. That is, polymer compounds such as starch, polyacrylic acid (salt) or a cross-linked product thereof (water absorbent resin), polyvinyl alcohol, and polyethyleneimine; various chelating agents, various additives, and the like can be added in an amount of, for example, 0% to 30% by weight, preferably 0% to 20% by weight, more preferably 0% to 10% by weight, and still more preferably 0% to 3% by weight, relative to the monomers. Meanwhile, according to the present invention, the aqueous monomer solution may include even a dispersion liquid having a concentration exceeding the saturation concentration, but preferably, the aqueous monomer solution is an aqueous solution at a concentration equal to or less than the saturation concentration. Here, the lower limit of the amount of addition of the optional components in the case of adding the optional components described above, is appropriately determined in accordance with the type, purpose and effect of the optional components and is not particularly limited; however, the lower limit is preferably about 0.001% by weight relative to the monomers.

Furthermore, additives such as various expanding agents (carbonates, azo compounds, air bubbles, and the like), surfactants, various chelating agents, hydroxycarboxylic acids, and reducing inorganic salts can be added in an amount of, for example, 0% to 5% by weight, and preferably 0% to 1% by weight, relative to the monomers. Here, the lower limit of the amount of addition of the additives when the additives described above are added is appropriately determined in accordance with the type, purpose and effect of the additives and is not particularly limited, but the lower limit is preferably about 0.001% by weight relative to the monomers.

Among these, when it is intended to suppress coloration over time of the water absorbent resin (enhancement of color tone stability in long-term storage under high temperature and high humidity) or to enhance urine resistance (prevention of gel deterioration), a chelating agent, a hydroxycarboxylic acid, and a reducing inorganic salt are preferably used, and a chelating agent is particularly preferably used. The using amount in this case is preferably 10 ppm to 5,000 ppm, more preferably 10 ppm. to 1,000 ppm, still more preferably 50 ppm to 1,000 ppm, and particularly preferably 100 ppm to 1,000 ppm, relative to the water absorbent resin. Meanwhile, in regard to the chelating agent, hydroxycarboxylic acid and reducing inorganic salt, the compounds disclosed in US Patent Application Publication No. 2009/0275470, EP No. 2057228, and EP No. 1848758 are used.

(3-2) Polymerization Step (a) Polymerization Method

The water absorbent resin of the present invention is produced by crosslinking polymerizing the unsaturated monomer described above, and thereby obtaining a polymer gel. The polymerization method is usually carried out by spray polymerization, dropping polymerization, aqueous solution polymerization or reverse phase suspension polymerization, in view of performance or the ease of control of polymerization. However, among these, aqueous solution polymerization or reverse phase suspension polymerization is preferred, aqueous solution polymerization is more preferred, and continuous aqueous solution polymerization is particularly preferred.

Meanwhile, reverse phase suspension polymerization is a polymerization method in which an aqueous monomer solution is suspended in a hydrophobic organic solvent, and the method is described in, for example, U.S. patents such as U.S. Pat. Nos. 4,093,776, 4,367,323, 4,446,261, 4,683,274, and 5,244,735. On the other hand, aqueous solution polymerization is a method of polymerizing an aqueous monomer solution without using a dispersion solvent, and is described in, for example, US patents such as U.S. Pat. Nos. 4,625,001, 4,873,299, 4,286,082, 4,973,632, 4,985,518, 5,124,416, 5,250,640, 5,264,495, 5,145,906, and 5,380,808; and European patents such as EP Nos. 0811636, 0955086, 0922717, and 1178059. Furthermore, spray polymerization or dropping polymerization is a method of dispersing liquid droplets of an aqueous monomer solution in a gas phase, and performing polymerization, and is described in, for example, international PCT applications such as WO 2011/026876, WO 2008/009598, and WO 2005/030810. In relation to these polymerization methods, the monomers, crosslinking agents, polymerization initiators, other additives and the like described above can be used in the present invention.

According to the present invention, from the viewpoint of enhancing the physical properties of the particulate water absorbent resin thus obtainable and the drying efficiency, it is preferable to volatilize at least a portion of the polymerization solvent by the polymerization heat generated at the time of polymerization, and for example, the increment of the solids concentration before and after polymerization ("Solids concentration of polymer gel after polymerization"-"monomer concentration before polymerization") is preferably 0.1% by weight or greater, more preferably 1% to 40% by weight, still more preferably 2% to 30% by weight, and particularly preferably 3% to 20% by weight. The increment of solids concentration is appropriately determined by the temperature at the time of polymerization (for example, polymerization at the boiling point), gas, shape (particle size of the polymer gel or sheet thickness), or the like. Meanwhile, the solids concentration of the polymer gel after polymerization is 30% to 80% by weight, and more preferably in the ranges described above (35% by weight or greater, 40% by weight or greater, 45% by weight or greater, 50% by weight or greater, 55% by weight or greater, or 60% by weight or greater).

These polymerization methods can be carried out in an air atmosphere, but from the viewpoint of prevention of coloration, it is preferable to perform polymerization in an inert gas atmosphere of nitrogen, argon or the like (for example, at an oxygen concentration of 1% by volume or less). Furthermore, it is preferable to perform polymerization after purging dissolved oxygen in the monomers or a solution containing the monomers, with an inert gas (for example, dissolved oxygen concentration: less than 1 [g/L]). Furthermore, polymerization can be carried out at any pressure, such as under reduced pressure, at normal pressure, or under pressure.

The present invention is more effective when production is carried out in a large scale with a large production output per line of the water absorbent resin. The production output is preferably 0.5 [t/hr] or greater, more preferably 1 [t/hr] or greater, still more preferably 5 [t/hr] or greater, and particularly preferably 10 [t/hr] or greater. Preferred forms of the aqueous solution polymerization include continuous belt polymerization (disclosed in U.S. Pat. No. 4,893,999, U.S. Pat. No. 6,241,928, US Patent Application Publication No. 2005/215734, and the like), continuous kneader polymerization, batch kneader polymerization (disclosed in U.S. Pat. No. 6,987,151, U.S. Pat. No. 6,710,141, and the like), and the like. Among these, continuous kneader polymerization or continuous belt polymerization, and particularly, continuous kneader polymerization or continuous belt polymerization achieved by evaporating water, is particularly preferred.

In regard to the continuous aqueous solution polymerization, most preferred examples include high temperature initiated polymerization in which the polymerization initiation temperature is set to preferably 30° C. or higher, more preferably 35° C. or higher, still more preferably 40° C. or higher, and particularly preferably 50° C. or higher (the upper limit is the boiling point); and high monomer concentration polymerization in which the monomer concentration is set to preferably 35% by weight or greater, more preferably 40% by weight or greater, and still more preferably 45% by weight or greater (the upper limit is saturation concentration). Meanwhile, the polymerization initiation temperature is defined as the temperature of the liquid immediately before the aqueous monomer solution is supplied to the polymerization reactor, and the conditions disclosed in U.S. Pat. No. 6,906,159, U.S. Pat. No. 7,091,253, and the like can be preferably applied to the present invention.

(b) Polymerization Initiator

For the polymerization initiator used in the present invention, the various polymerization initiators exemplified in the Patent Literatures described above can be used, and the polymerization initiator is appropriately selected depending on the polymerization form, and is not particularly limited. Examples include a thermally degradable type polymerization initiator, a photodegradable type polymerization initiator, and a redox-type polymerization initiator. More specifically, examples of the thermally degradable type polymerization initiator include persulfates such as sodium persulfate, potassium persulfate, and ammonium persulfate; peroxides such as hydrogen peroxide, t-butyl peroxide, and methyl ethyl ketone peroxide; and azo compounds such as 2,2'-azobis(2-amidinopropane) dihydrochloride, and 2,2'-azobis[2-(2-imidazolin-2-yl)propane]dihydrochloride. Furthermore, examples of the photodegradable type polymerization initiator include benzoin derivatives, benzyl derivatives, acetophenone derivatives (for example, 1-hydroxycyclohexyl phenyl ketone), benzophenone derivatives, and azo compounds. Furthermore, examples of the redox-type polymerization initiator include systems obtained by combining the persulfates or peroxides with reducing compounds such as L-ascorbic acid and sodium hydrogen sulfite. According to a preferred embodiment, the thermally degradable type polymerization initiator and the photodegradable type polymerization initiator may be used in combination. Furthermore, according to another preferred embodiment of the present invention, a photodegradable type polymerization initiator and a thermally degradable type polymerization initiator may be used in combination. The using amount of these polymerization initiators is preferably 0.0001% to 1% by mole, and more preferably 0.001% to 0.5% by mole, relative to the monomers. If the using amount of the polymerization initiator is larger than 1% by mole, it is not preferable because coloration of the water absorbent resin may occur. Furthermore, if the using amount of the polymerization initiator is less than 0.0001% by mole, it is not preferable because there is a risk that the amount of residual monomers may increase. Meanwhile, polymerization may also be carried out by irradiating active energy rays such as a radiation, an electron beam, and ultraviolet radiation, instead of using the polymerization initiators. Alternatively, polymerization may also be carried out by using these active energy rays and polymerization initiators in combination.

(3-3) Gel Grain Refining Step

The present step is a step by which the polymer gel obtained in the polymerization step is cracked, and a particulate water-containing gel-like cross-linked polymer (hereinafter, also referred to as "particulate polymer gel") is obtained.

In view of the drying efficiency and in view of the pulverization efficiency after drying, it is preferable that the polymer gel before drying be grain-refined during polymerization or after polymerization. Meanwhile, in the reverse phase suspension polymerization, spray polymerization or dropping polymerization, a particulate polymer gel is obtained during polymerization, so that these polymerization steps and a gel grain refining step are carried out simultaneously. However, in the present invention, it is preferable for the polymer gel obtained by aqueous solution polymerization, to be made into a particulate polymer gel through a mechanical gel grain refining step.

The polymer gel obtained by aqueous solution polymerization in the present invention, which is, for example, in a bulk state or in a sheet form, is subjected to grain refining by means of a cracking apparatus, and is dried. Furthermore, in spray polymerization, dropping polymerization and reverse phase suspension polymerization, a particulate polymer gel which has been subjected to a gel grain refining step during polymerization, is obtained by dispersion polymerization in a liquid phase or a gas phase. The particulate polymer gel may be dried directly, or if necessary, the particle size may be adjusted by cracking or agglomeration.

The polymer gel obtained by the polymerization step described above, particularly aqueous solution polymerization, may be dried directly; however, the polymer gel is preferably subjected to gel cracking in a mechanical gel grain refining step, that is, by using a cracker (kneader, a meat chopper, a cutter mill, or the like) as necessary, during polymerization or after polymerization, and the polymer gel is made into a particulate form. That is, a polymer gel grain refining (hereinafter, also referred to as "gel cracking") step may be further included between a polymerization step based on continuous belt polymerization or continuous kneader polymerization, and a drying step. Meanwhile, even the case where the gel has been grain refined by dispersion in a solvent at the time of polymerization, such as reverse phase suspension polymerization, is intended to be included in the graining refining of the present invention (grain refining of the polymerization step); however, suitably the polymer gel is cracked by using a cracker. Furthermore, in the grain refining (cracking) step, incorporation of the additives described above to the polymer gel, post-neutralization of the acid groups of polyacrylic acid (salt), or post-crosslinking of polyacrylic acid (salt) may also be carried out. The final neutralization ratio and the amount of internal crosslinking agent are in the ranges described above, and for the post-neutralization after polymerization, sodium hydroxide, a (hydrogen) carbonate, or an aqueous solution or aqueous dispersion thereof is used. Furthermore, a crosslinking agent which is capable of reacting with carboxyl groups of (poly)ethylene glycol diglycidyl ether, a water-soluble polyvalent metal salt or the like, which is described in relation to the crosslinking agent (internal crosslinking agent), can be appropriately used for the post-crosslinking after polymerization.

In regard to the temperature of the polymer gel at the time of gel cracking, the polymer gel is kept warm or heated preferably to 40° C. to 95° C., and more preferably 50° C. to 80° C., in view of the physical properties. The resin solids content of the particulate polymer gel at the time of gel cracking or after cracking is not particularly limited, but in view of the physical properties, the resin solids content is 35% to 75% by weight. Meanwhile, in the gel cracking step, water, a polyhydric alcohol, a liquid mixture of water and a polyhydric alcohol, an aqueous solution of a polyvalent metal, or vapors thereof may be added as necessary, for the purpose of enhancing the cracking efficiency. Furthermore, in the case of cracking a polymer gel having a high solids concentration (for example, 45% to 70% by weight), to which the present invention can be preferably applied, the interior of the cracking apparatus may be aerated, and preferably ventilated with dry air.

As a preferred particle size of the particulate polymer gel, the mass median particle size (D50) that can be determined by standard sieve classification is in the range of 0.5 mm to 10 mm, preferably in the range of 1 mm to 5 mm, more preferably 1 mm to 3 mm, and particularly preferably 1 mm to 2 mm. In the present invention, when the particulate water-containing gel is dispersed in the gas stream in a drying step, particularly in a drying step using a ventilated dryer, the particulate water-containing gel is separated by the filter described above. Meanwhile, as the method of controlling the particle size to the range described above in the gel grain refining step, the methods described in U.S. Pat. Nos. 6,906,159, 5,275,773, 6,100,305, 6,140,395, and 6,875,511; and US Patent Application Publication Nos. 2004/234,607 and 2005/46,069 are employed. Even in the case where the polymer gel before drying includes particles having a particle size of less than 1 mm, the present invention is suitably applied.

(3-4) Fine Powder Recycling Step

The present step refers to a step of separating a fine powder (particularly, a fine powder containing 70% by weight or more of a powder having a particle size of 150 µm or less) that is generated in the drying step and if necessary, the pulverization step and the classification step, and then recycling the fine powder to the polymerization step or the drying step directly or after hydration of the fine powder. The methods described in US Patent Application Publication No. 2006/247,351 and U.S. Pat. No. 6,228,930 can be applied. When the fine powder is recycled, the particle size of the water absorbent resin can be controlled, and at the same time, a high solids concentration can be easily achieved by addition of the fine powder. Furthermore, the water absorbent resin after drying can be easily detached from the ventilated belt of the dryer, and therefore, it is preferable. That is, it is preferable that the method of the present invention further include a step of recycling a water absorbent resin fine powder or a hydration product thereof to a polymerization step or a drying step.

(3-5) Drying Step

The present step is a step of drying the particulate water-containing gel-like cross-linked polymer (polymer gel) obtained in the polymerization step or the gel grain refining step, and obtaining a dried product.

As the drying method according to the present invention, various methods can be employed to achieve a target moisture content. Examples include a conduction heat transfer type dryer, a radiation heat transfer type dryer (for example, infrared drying), a hot air heat transfer type dryer, a dielectric heating type dryer (for example, microwave drying), azeotropic dehydration using a hydrophobic organic solvent, and combinations thereof. These drying steps may be carried out under reduced pressure, but preferably, a hot air heat transfer type dryer is used, due to the drying efficiency.

Examples of the hot air drying method include a method of performing drying in a static state, a method of performing drying in a stirred state, a method of performing drying in a vibrated state, a method of performing drying in a fluidized state, and a method of performing drying by means of a gas stream. Among these, from the viewpoint of efficiency, hot air drying utilizing fluidized bed drying or static drying (more particularly, ventilated band drying), and more particularly continuous static drying (continuous ventilated band drying), is used. For these hot air drying steps, the present invention can be preferably applied. Furthermore, for the ventilated band drying such as continuous ventilated band drying, it is preferable to use a ventilated band type drying apparatus such as a continuous ventilated band type drying apparatus having multiple chambers. That is, for the drying step, it is preferable to use a continuous ventilated band type dryer having multiple chambers. Thereby, the temperature of the hot air blown to the particulate water-containing gel-like cross-linked polymer (polymer gel), the dew point, and the flow volume can be varied in multiple stages. At this time, the number of drying chambers is preferably 5 chambers or more, more preferably 6 chambers or more, and particularly preferably 8 chambers or more. The size of the respective rooms of the drying chambers (in other words, the length in the travel direction of the belt) may be identical or may be different. Furthermore, the hot air is blown so as to be able to pass vertically (downward from the above, or upward from the below) through the gel layer of the polymer gel. Meanwhile, the upper limit of the number of drying chambers may be appropriately set in accordance with the production output or the like, but usually, about 20 chambers are sufficient. Meanwhile, a ventilated band type dryer having multiple chambers is illustrated in Patent Literature 28 (US Patent Application Publication No. 2008/0,214,749), FIG. 2 of Patent Literature 31 (JP 8-73518 A and corresponding JP 2700531 B1), or in FIG. 3.6 of Non-Patent Literature 1 (Modern Superabsorbent Polymer Technology (1998)). In addition, manufacturers that produce and sell the ventilated type drying apparatus (ventilated band dryer) in Japan include, for example, Kurimoto, Ltd.; Kumeta Seisakusho Co., Ltd.; Dalton Co., Ltd.; Fuji Paudal Co., Ltd.; and Okawara Manufacturing Co., Ltd.

As a technology of the related art, the methods of drying a water absorbent resin using a ventilated dryer, particularly a ventilated band type dryer, are described in Patent Literatures 28 to 32, as well as WO 2011/025012 (date of PCT filing: Aug. 30, 2010) which is not published as of Jun. 8, 2010 at the time of filing the present application, WO 2011/025013 (the same), and PCT/JP2011/051004 (date of PCT filing: Jan. 20, 2011) and PCT/JP2011/051003 (the same), which are still not published. However, the related art literatures including FIG. 2 of Patent Literature 31 and FIG. 3.6 of Non-Patent Literature 1 do not disclose the filter of the present invention, particularly, the wire mesh before reheating the high temperature gas stream, the punching metal after reheating, or the particular diameter and ratio of opening area thereof. Furthermore, drying by means of a ventilated band type hot air dryer generally requires drying in a large quantity (amount and time), and therefore, an experiment may be carried out by using a batch type static ventilated dryer as a model, as in the Examples described below.

In an industrial-scale experiment (setting of drying conditions) using a ventilated continuous drying apparatus such as a ventilated band type hot air dryer, generally, continuous drying of a large quantity (particularly 0.5 [t/hr] or more, more particularly 1 [t/hr] or more, or 5 [t/hr] or more) and production for several hours or several days are required. However, since the physical properties of the water absorbent resin powder obtainable in the case of setting the drying conditions constant, exhibit almost the same behavior in both continuous drying and batch drying, batch type drying can be employed as a simulation test for ventilated type continuous drying. That is, a drying experiment is carried out in a small scale (several kilograms to several ten kilograms per batch) as a model experiment for ventilated type continuous drying, and the operating conditions of a ventilated band type hot air dryer can be determined while the correlation between the continuous drying in a large scale and the batch drying in a small scale is checked. For example, it is also possible to apply the drying conditions in the ventilated static batch type dryer of the Examples described below, directly to the drying step in a ventilated band type hot air dryer. As such, when the drying conditions of a ventilated band type hot air dryer are determined based on the drying results in a ventilated static batch type dryer, a scale-up of the drying output per unit hour to 10 times or more, 100 times or more, or 200 to 10,000 times, is facilitated.

Furthermore, even if any one of a ventilated band type hot air dryer and a ventilated static batch type dryer is used as the dryer, the effect of the present invention can be similarly achieved as long as the hot air temperature range of the drying step and the gas volume are adjusted to particular ranges. That is, even if any one of a ventilated band type hot air dryer and a ventilated static batch type dryer is used, a decrease in the water absorption physical properties (for example, a decrease in the rate of water absorption (FSR)), coloration, or a decrease in the drying efficiency or yield can be suppressed by appropriately selecting the drying conditions.

The dryer that performs hot air drying usually has a fan that generates a gas stream, a heat exchanger that heats the gas, and a drying chamber that dries the polymer, and these are connected with pipes or the like. The polymer is usually retained in the drying chamber by means of a punching metal or a net. In the step of continuous static drying, a punching metal or a net forms a continuous belt.

Meanwhile, since a fluidized bed dryer usually has a larger gas volume and a larger amount of scattering of the water-containing gel as compared with a ventilated band type dryer, there is a possibility that clogging may occur when only a filter is used. Thus, in the case of applying the present invention to a fluidized bed dryer, it is preferable to first collect the water-containing gel in the high temperature gas stream by using a cyclone, subsequently separate the water-containing gel remaining in the high temperature gas stream with a filter, and if necessary, collect the separated water-containing gel. The method for producing a water absorbent resin by using a fluidized bed dryer having a cyclone is disclosed in Patent Literature 33 (WO 2009/028568 and corresponding US Patent Application Publication No. 2010/0,249,320). However, the Patent Literature does not have any description on the collection ratio obtainable by using a cyclone, or colored foreign substances originating from the water-containing gel included in the high temperature gas stream.

The drying step is usually carried out in a temperature range (hot air temperature) of 100° C. to 250° C., preferably 100° C. to 220° C., more preferably 120° C. to 200° C., particularly preferably 150° C. to 190° C., and particularly 160° C. to 190° C. In regard to the gas velocity of the hot air that passes through the drying chambers, a velocity that is as fast as possible to the extent that the polymer would be not much blown away, is efficient, and the gas velocity is 0.1 to 5 [m/s], preferably 0.5 to 3 [m/s], 1.0 to 2.9 [m/s], or 1.2 to 2.8 [m/s]. If the gas velocity is less than 0.1 [m/s], the rate of water absorption after drying may decrease, or the time required to dry to a predetermined moisture content ratio becomes too long, so that there is a risk that the dryer may become huge. On the other hand, if the gas velocity exceeds 5 [m/s], a large amount of the polymer may escape from the drying chamber, and there is a possibility that stable operation may become difficult. The drying time depends on the surface area of the polymer, the moisture content ratio, the type of the dryer, and the gas volume, and the drying time is selected so as to obtain an intended moisture content ratio. For example, the drying may be appropriately selected in the range of 1 minute to 1 hour.

The gas that is brought into contact with the water-containing gel or the like preferably contains water vapor, and although the dew point of the gas can be altered by the drying method or in accordance with the purpose, the gas has a dew point of preferably 30° C. to 100° C., and more preferably a dew point of 30° C. to 90° C. When the dew point is controlled to this range, the scattering or falling of the polymer gel during drying can be suppressed, or the amount of residual monomers can be reduced. Meanwhile, the dew point is defined as the value obtainable at the time point at which at least the moisture content ratio of the water-containing gel is at least 10% by weight, and preferably 20% by weight or higher.

The present invention exhibits the effect more effectively when the water absorbent resin is subjected to a gas that is at least partially upward. Meanwhile, in the case of using a downward gas in a ventilated band dryer, a static dryer or the like, the gas strikes the water absorbent resin, and then the gas passes through the punching metal or net on which the water absorbent resin is retained. However, the filter of the present invention adopts a concept that is different from this. A preferred hole size of the punching metal or net on which the water absorbent resin is retained, which is used in the ventilated band dryer, and a preferred ratio of falling and scattering are as follows from the viewpoint of drying efficiency. At this time, since the punching metal or net has a structure in which falling and scattering of the polymer gel or a dried product can occur, usually the effect as the filter of the present invention is not exhibited.

The solids content of the dried product (hydrophilic cross-linked polymer) obtainable by this drying increases preferably to 85% to 97% by weight, and more preferably 90% to 97% by weight.

(3-6) Still More Preferred Drying Method

The present invention is characterized by the control as described above, but a still more preferred drying method for ventilated band drying will be described.

(a) Drying Apparatus

As the drying apparatus used in the present invention, a ventilated dryer, particularly a ventilated band type dryer (belt type dryer) is preferably used, but if necessary, other dryers may also be used. Specifically, one kind or two or more kinds of a conduction heat transfer type dryer, a radiation heat transfer type dryer, a hot air heat transfer type dryer, a dielectric heating dryer and the like may be used, and among these, from the viewpoint of the drying velocity, a hot air heat transfer type dryer (hereinafter, referred to as "hot air dryer") is preferably used. Examples of the hot air dryer include various hot air dryers of ventilated belt type (band type), ventilated circuit type, ventilated vertical type, parallel stream belt (band) type, ventilated tunnel type, ventilated stirred channel type, fluidized bed type, gas stream type, and spray type. However, in the present invention, from the viewpoint of controlling the physical properties, a ventilated belt type dryer (band type dryer) is used. Dryers of other types can also be used in combination, but it is preferable to use only a ventilated belt type dryer (band type dryer).

In regard to the above ventilated belt type dryer used in the present invention, a ventilated belt type dryer in which a ventilated belt having a belt length of preferably 5 m to 100 m, more preferably 10 m to 70 m, and still more preferably 20 m to 60 m, is made in an endless form is used. Furthermore, the belt width is not limited, but the belt width is appropriately determined in the range of usually 0.5 m to 10 m, and preferably 1 to 5 m. Also, the ratio of the belt length and the belt width may be appropriately determined according to the purpose, but usually, the belt length is longer than the belt width, and is preferably 3 to 500 times, and more preferably 5 to 100 times.

As the ventilated belt, for example, a wire mesh or punching metal having a mesh size of 45 μm to 1,000 μm, and more preferably 150 μm to 500 μm, may be used; however, in order to exhibit the effect of the present invention, a punching metal is preferably used. In the case of drying in a batch mode by using a punching metal as described above, the punching metal may be referred to as a punching plate.

The shape of the holes of the punching metal is not particularly limited, as described in connection with the filter.

According to the present invention, the transport velocity of the polymer gel can be appropriately adjusted based on the belt length, belt width, production output, drying time and the like, but from the viewpoints of the load of the belt driving apparatus, durability and the like, the transport velocity is preferably 0.3 to 5 [m/min], more preferably 0.5 to 2.5 [m/min], still more preferably 0.5 to 2 [m/min], and particularly preferably 0.7 to 1.5 [m/min]. When the transport velocity is adjusted in the range described above, the ratio of falling and scattering can be suppressed to a low level. Furthermore, if the transport velocity is greater than the range described above, durability of the apparatus decreases, and also vibration of the apparatus becomes vigorous, causing an increase in the ratio of falling and scattering, which is not preferable. If the transport velocity is lower than the range described above, productivity deteriorates, and it is not preferable.

In order to achieve the present invention, it is preferable to change the drying conditions (drying temperature, dew point, and gas volume) in multiple stages. Accordingly, a ventilated belt type dryer having multiple chambers is used in the present invention, and a continuous ventilated belt type dryer preferably having 5 chambers or more, more preferably 6 chambers or more, and still more preferably 8 chambers or more, is preferred. The upper limit is appropriately set depending on the production output or the like, but usually about 20 chambers are sufficient.

(b) Ratio of Opening Area and Holes

The "ratio of opening area" of the ventilated belt of the ventilated band type dryer used in the present invention means the ratio (percentage) of total opening area of the wire mesh or punching metal relative to the area of the entire surface of the ventilated belt.

According to the present invention, the ratio of opening area is preferably 15% to 50%, and more preferably 20% to 45%, in order to control the ratio of falling and scattering to a low level. If the ratio of opening area is not in the range described above, not only the ratio of falling and scattering may decrease, but also the physical properties of the water absorbent resin deteriorate, and the drying efficiency or the continuous drying performance tends to decrease.

Meanwhile, according to the present invention, the holes of the punching metal preferably have a particular size as described below. That is, the area per hole (in the case of having plural kinds of holes, the area per hole is defined as the average area) is preferably larger than the cross-sectional area of one grain of the polymer gel, and more preferably in the range of 2 to 100 times, and more preferably 4 to 50 times. Furthermore, the maximum distance of opening of the hole (if the shape of the hole is circular, the diameter; and if the shape is oval, the major axis) is preferably larger than the mass median particle size (D50) of the polymer gel, and is more preferably in the range of 2 to 100 times, and still more preferably 4 to 50 times. Furthermore, the average area of opening of the holes is preferably 5 $mm^2$ to 500 $mm^2$, more preferably 10 $mm^2$ to 100 $mm^2$, and still more preferably 15 $mm^2$ to 50 $mm^2$. If the size of the hole of the punching metal is smaller than the range described above, the drying efficiency decreases, and if the size is larger, the ratio of falling and scattering increases, which is not preferable.

Furthermore, according to the present invention, it is preferable that at least a portion, and preferably 1% to 50% by weight of the polymer gel be smaller than the holes of the punching metal. Meanwhile, a technology of drying a polymer gel (for example, 1 mm to 2 mm) on a wire mesh (for example, mesh size: 300 μm) has been conventional known; however, the ratio of falling and scattering can be controlled to a low level even by using a ventilated belt having larger holes than in the case of the conventional technology. According to the present invention, even in the case of polymerizing an aqueous monomer solution of high concentration, the physical properties can be maintained and enhanced, and thus a water absorbent resin which is free from coloration, drying unevenness or a decrease in the yield, can be obtained.

(c) Thickness of Polymer Gel

According to the present invention, the thickness and the state of the polymer that is laminated on the ventilated belt are not particularly limited; however, from the viewpoints of uniform drying and physical properties maintenance, it is preferable to dry the polymer gel on a ventilated belt by giving variation in the thickness, rather than making the thickness uniform. Specifically, it is preferable to set the thickness change ratio (1) in the width direction of the polymer gel (hereinafter, referred to as "thickness change ratio (1)") to 1.05 to 5, and it is preferable to set the thickness change ratio (2) in the width direction of the polymer gel (hereinafter, referred to as "thickness change ratio (2)") to 1.05 to 3.00. Meanwhile, the thickness change ratio (1) and the thickness change ratio (2) are defined by the following formulas.

Thickness change ratio (1) [%]=(Maximum thickness in the width direction of the polymer gel)/(average thickness)×100   [Mathematical Formula 2]

Thickness change ratio (2) [%]=(Maximum thickness of the polymer gel at the two ends of the ventilated belt)/(average thickness)×100   [Mathematical Formula 3]

The thickness in the width direction of the polymer gel is the thickness at the cross-section in the direction perpendicular to the travel direction of the ventilated belt that is continuously operated, and is the thickness of the polymer gel in the width direction measured at a certain section in the travel direction of the ventilated belt described above. That is, the thickness of the polymer gel of the present invention is the thickness before drying is initiated on the ventilated belt; in other words, the thickness is the gel thickness until the solids concentration of the polymer gel increases. Meanwhile, the phrase "until the solids concentration increases" implies that relative to the solids concentration of the polymer gel before drying, the solids concentration increases by 1% by weight, more preferably increases by 0.5% by weight, and still more preferably increases in the range of greater than 0% by weight.

In order to control the ratio of falling and scattering, the average value of the thickness of the polymer gel that is laminated on the ventilated belt is usually controlled to 1 cm to 30 cm, preferably 2 cm to 20 cm, more preferably 5 cm to 15 cm, and particularly preferably 7 cm to 13 cm. Furthermore, the thickness of the polymer gel on the ventilated belt, that is, the upper and lower limits of the thickness of the polymer gel, is 0 cm to 30 cm, preferably 5 cm to 20 cm, more preferably 8 cm to 15 cm, and particularly preferably 9 cm to 11 cm, and it is desirable to allow the thickness to vary in that range.

(d) Area Occupancy

In the production method of the present invention, the area occupancy means the ratio (percentage) of the area (B) occupied by a laminate of the polymer gel on the surface of the ventilated belt, relative to the area (A) of the ventilated belt in the beginning of the drying step. That is, the area occupancy is defined by the following formula, from the area (A) that is determined from the product of the length and the width of a certain section in the beginning of the drying step, and the area (B) occupied by a laminate of the particulate water-containing gel scattered in that section.

Area occupancy [%]=$B/A$×100   [Mathematical Formula 4]

The area occupancy can be measured simultaneously with the gel thickness measurement, and is the proportion occupied by the polymer gel on the ventilated belt on the belt surface in a certain section until drying is initiated, after scattering of the polymer gel on the ventilated band is completed. In other words, the area occupancy is the proportion occupied by the polymer gel on the belt surface until the solids concentration of the polymer gel increases (the upper limit is preferably 1% by weight or less, more preferably 0.5% by weight or less, and particularly preferably greater than 0% by weight), and is the proportion occupied by the polymer gel in a rectangle or square including the two ends of the ventilated belt.

That is, the term "certain section" specifically means the range in which after scattering of the polymer gel on the ventilated band is completed, the ventilated belt travels in the travel direction of the ventilated belt, up to the length that is determined according to the length of 1/50 (LL50) to 1/10 (LL10) of the total length of the ventilated belt (in the case of an endless type, defined as the distance from the front end to the back end of the ventilated belt), or any one of the length of the ventilated belt that is traveled by the ventilated belt for 0.5 minutes from the time point of the initiation of drying (LT0.5) and the length of the ventilated belt that is traveled by the ventilated belt for 1 minute (LT1.0). The area determined by multiplying the length of this range (section) by the width of the belt, is defined as the area (A). Furthermore, the area (B)

is the area occupied by the polymer gel in the region of the area (A), that is, the area that is determined by multiplying the range (section) corresponding to the area (A) by the width of the region in which the polymer gel is scattered.

The area occupancy before the polymer gel is scattered on the ventilated belt is 0%, and the section before scattering or during scattering, including during the scattering of the polymer gel, is excluded from the object defined by the present invention. Furthermore, when the polymer gel is scattered by using a traverse feeder or a vibrating feeder, the polymer gel is laminated so as to draw an arc on the ventilated belt; however, in this case, the area occupancy is defined in a section which does not include an arc.

According to the present invention, the area occupancy is usually 85% to 100%, preferably 87% to 100%, more preferably 87% to 99%, still more preferably 90% to 98%, and particularly preferably 93% to 97%, from the viewpoint of controlling the ratio of falling and scattering. Meanwhile, when the area occupancy is not in the range described above, deterioration of the physical properties of the water absorbent resin is recognized, and a tendency of a decrease in the drying efficiency or continuous drying performance is recognized. Therefore, it is not preferable.

Non-occupied sites on the ventilated belt are appropriately determined, and areas where the polymer gel is not laminated may be provided at certain positions in the center, at the two ends, or in the middle. Preferably, a certain region where the polymer gel is not provided is installed at the two ends. Furthermore, when the area occupancy is periodically varied, the area occupancy is defined by the average value; however, it is preferable that 60% or more, preferably 70% or more, more preferably 75% or more, still more preferably 90% or more, and particularly preferably 100%, of the time provided for drying (drying time) have the area occupancy in the range described above.

(e) Ratio of Falling and Scattering

According to the present invention, the "ratio of falling and scattering" is the proportion of the polymer gel that is scattered (usually, the total amount of falling and scattering of the polymer gel or a dried product thereof) out of the belt, during the period in which the polymer gel supplied to the ventilated belt in the drying step is discharged at a predetermined position from the ventilated belt after the completion of drying and is conveyed to the subsequent step. Meanwhile, the ratio of falling and scattering can be determined by the following formula.

Ratio of falling and scattering (1) [%]=(Solids content of polymer gel collected from the outside of the ventilated belt [kg])/(solids content of polymer gel supplied to the ventilated belt [kg])×100   [Mathematical Formula 5]

or

Ratio of falling and scattering (2) [%]={1−(Solids content of polymer gel obtained from the outlet port of the drying step [kg])/(solids content of polymer gel supplied to the ventilated belt [kg])}×100   [Mathematical Formula 6]

The method for measuring these may be appropriately selected, but as a convenient and accurate method, the ratio of falling and scattering can be determined by actually measuring the weight of dried gel or a dried product thereof that has fallen or scattered from the drying belt.

The ratio of falling and scattering is not particularly limited, but a low ratio is preferred. Specifically, the ratio of falling and scattering (1) is preferably 1% or less, and more preferably 0% to 0.5%. Similarly, the ratio of falling and scattering (2) is preferably 1% or less, and more preferably 0% to 0.5%.

A specific means for controlling the ratio of falling and scattering of the hydro gel is not limited as long as the ratio of falling and scattering can be controlled to the range described above by using the methods described above (transport velocity of the belt, thickness of the hydro gel, area occupancy, and ratio of opening area) and the like. However, in addition to the methods described above etc., particularly, inclusion of a means for aggregating the polymer gel that is laminated on the ventilated belt in the early stage of drying, that is to say, a section for aggregation, a so-called aggregation treatment, is important. For example, methods of the following items (A) to (E) etc. may be listed as the aggregation treatment, and these methods may be used in combination.

(A) A method of suppressing the drying velocity in the early stage of drying, and thereby securing the aggregation time.

(B) A method of increasing the humidity in the drying chamber in the early stage of drying, and thereby accelerating aggregation.

(C) A method of providing a compression apparatus in the early stage of drying, and thereby forcibly inducing.

(D) A method of spraying an aggregating agent in the early stage of drying, and thereby forcibly inducing aggregation.

(E) A method of cooling the polymer gel, and thereby aggregating the polymer gel.

(3-6) Cooling Step

The dried product according to the present invention is preferably forcibly cooled in a cooling step. In regard to the forcible cooling temperature, in order to achieve the present invention, the dried product is forcibly cooled at a temperature of 95° C. or lower, preferably in the range of 85° C. to 35° C., more preferably 80° C. to 40° C., and still more preferably 70° C. to 45° C.

(3-7) Pulverization/Classification Step

The present step is a step by which the dried product obtained in the drying step is pulverized and classified, and thereby a water absorbent resin is obtained.

The present invention optionally has a pulverization step for the dried product that has aggregated after the drying step. The term "pulverization" is a mechanical operation in which, when the dried product thus obtained is an aggregate (block-like product), the dried product is made into a particulate form with fluidity, and is a mechanical operation of lightly loosening aggregation up to about several millimeters (mm) to several ten millimeters (mm), without reaching physical destruction or a significant decrease in the particle size of dried particles that constitute the aggregates. Particularly, when the dried product includes dry particles or aggregates having a size of 3 mm or greater, particularly in an amount of 5% by weight or more, the pulverization step is suitably applied.

As the pulverization method for the present invention, there are no particular limitations as long as a dried product or aggregates thereof (block-like product) can be converted to particles with fluidity, preferably particles having a weight average particle size (D50) of 2 mm or less. For example, one kind or two or more kinds of a method of performing pulverization by using a hammer type pulverizer, a jet gas type pulverizer or the like, and various pulverization or cracking methods that are conventionally known can be used.

A dried product is pulverized and classified for the purpose of particle size control. Methods for these are described in, for example, US Patent Application Publication No. 2006/024,755, but various pulverization methods can be used without limitations.

The particulate water absorbent resin obtained by pulverization is adjusted by a classification step to have a mass median particle size (D50) of 200 μm to 600 μm, preferably 200 μm to 550 μm, more preferably 250 μm to 500 μm, and particularly preferably 350 μm to 450 μm, and if the particulate water absorbent resin is exclusive for sanitary materials, the water absorbent resin is usually subjected to surface crosslinking thereafter. The water absorbent resin obtainable by the classification step is pulverized, if the water absorbent resin is exclusive for sanitary materials, such that preferably particles having a size of greater than or equal to 150 μm and less than 850 μm occupy 80% to 99% by weight, and more preferably 90% to 99% by weight.

A fine powder that has been generated in the pulverization step and separated in the classification step is recycled as described above, if necessary. The particle size of the particulate water absorbent resin before the surface crosslinking is preferably applied after surface crosslinking and even to the final product, and the particulate water absorbent resin may also be classified again after surface crosslinking.

(3-8) Surface Crosslinking Step

According to the present invention, the water absorbent resin obtained in the (3-7) classification step described above can be subjected to a conventionally known surface crosslinking step and converted to a water absorbent resin which is suitable exclusive for sanitary materials. Surface crosslinking is to provide a part having a higher crosslinking density in the surface layer (near the surface, usually approximately several ten micrometers (μm) from the surface of the water absorbent resin), and can be formed by radical crosslinking or surface polymerization at the surface, or a crosslinking reaction with a surface crosslinking agent.

As the surface crosslinking agent that can be used in the present invention, various organic crosslinking agents or inorganic crosslinking agents may be listed examples, but from the viewpoint of the physical properties or handiness, a crosslinking agent which is capable of reacting with a carboxyl group is preferred. Examples thereof include polyhydric alcohol compounds, epoxy compounds, polyvalent amine compounds or condensates thereof with haloepoxy compounds, oxazoline compounds, mono-, di- or polyoxazolidinone compounds, polyvalent metal salts, and alkylene carbonate compounds.

More specifically, the compounds exemplified in U.S. Pat. Nos. 6,228,930, 6,071,976 and 6,254,990 may be used. Examples thereof include, but are not particularly limited to, polyhydric alcohol compounds such as mono-, di-, tri-, tetra- or polyethylene glycol, monopropylene glycol, 1,3-propanediol, dipropylene glycol, 2,3,4-trimethyl-1,3-pentanediol, polypropylene glycol, glycerin, polyglycerin, 2-butene-1,4-diol, 1,4-butanediol, 1,3-butanediol, 1,5-pentanediol, 1,6-hexanediol, and 1,2-cyclohexanedimethanol; epoxy compounds such as ethylene glycol diglycidyl ether and glycidol; polyvalent amine compounds such as ethylenediamine, diethylenetriamine, triethylenetetramine, tetraethylenepentamine, pentaethylenehexamine, polyethyleneimine, and polyamide polyamine; haloepoxy compounds such as epichlorohydrin, epibromohydrin, and α-methylepichlorohydrin; condensates of the polyvalent amine compounds and the haloepoxy compounds; oxazolidinone compounds such as 2-oxazolidinone; alkylene carbonate compounds such as ethylene carbonate; oxetane compounds; and cyclic urea compounds such as 2-imidazolidinone.

The using amount of the surface crosslinking agent depends on the compounds used, combinations thereof or the like, and is preferably in the range of 0.001 parts to 10 parts by weight, and more preferably in the range of 0.01 parts to 5 parts by weight, relative to 100 parts by weight of the water absorbent resin particles. According to the present invention, water can be used together with the surface crosslinking agent. At this time, the amount of water used is preferably in the range of 0.5 parts to 20 parts by weight, and more preferably 0.5 parts to 10 parts by weight, relative to 100 parts by weight of the water absorbent resin particles. Furthermore, according to the present invention, a hydrophilic organic solvent can also be used, in addition to water. At this time, the amount of the hydrophilic organic solvent used is in the range of 0 parts to 10 parts by weight, and preferably 0 parts to 5 parts by weight, relative to 100 parts by weight of the water absorbent resin particles. Also, upon the incorporation of a crosslinking agent solution into the water absorbent resin particles, a water-insoluble fine particle powder or a surfactant may be incorporated together to the extent that the effects of the present invention are not impaired, for example, in an amount of 0% to 10% by weight, preferably 0% to 5% by weight, and more preferably 0% to 1% by weight. Preferred surfactants and a method of use thereof are described in, for example, U.S. Pat. No. 7,381,775.

The addition of the surface crosslinking agent can be carried out by various techniques. However, a method of mixing a surface crosslinking agent in advance with water and/or a hydrophilic organic solvent as necessary, and then spraying or dropping the mixture to the particulate water absorbent resin is preferred, and a method of spraying is more preferred.

The water absorbent resin after mixing with a surface crosslinking agent is preferably subjected to heating, and is subsequently subjected to cooling as necessary. The heating temperature is preferably in the range of 100° C. to 250° C., and more preferably 150° C. to 250° C. Furthermore, the heating time is preferably in the range of 1 minute to 120 minutes. The heating treatment can be carried out by using a conventional dryer or a conventional heating furnace. At this time, when the water absorbent resin is exposed to a heated gas in an apparatus which heats the water absorbent resin by exposing the resin to a high temperature gas, and then the high temperature gas is reused, the present invention is applicable. That is, when the water absorbent resin is exposed to a gas at 100° C., and then this gas is reused, the gas is passed through a filter or a wire mesh.

The gas velocity of the heated gas is preferably 0.01 to 1 [m/s], and more preferably 0.05 to 0.7 [m/s]. Since the water absorbent resin used in surface crosslinking usually contains particles having a particle size of 150 μm to 850 μm at a proportion of preferably 50% to 100% by weight, and more preferably 70% to 95%, if the gas velocity is greater than 1 [m/s], the water absorbent resin is blown off by the gas. On the other hand, if the gas velocity is less than 0.01 [m/s], deterioration of the heat transfer efficiency is observed.

Furthermore, as another embodiment of the surface crosslinking treatment according to the present invention, a method of adding a treatment liquid containing a radical polymerizable compound to the particulate water absorbent resin and then irradiating the resin with active energy to achieve a surface crosslinking treatment, may be used, and this is described in, for example, U.S. Pat. No. 7,201,941. Furthermore, a surface crosslinking treatment can also be achieved by adding a surfactant to the treatment liquid and irradiating active energy thereto. Furthermore, as another embodiment of the surface crosslinking treatment according to the present invention, a method of adding an aqueous solution containing a peroxide radical initiator to the particulate water absorbent resin, and then heating the resin to achieve a surface crosslinking treatment, may be used. This is described in, for example, U.S. Pat. No. 4,783,510.

(3-9) Addition Step

For the particulate water absorbent resin, a lubricating agent, a chelating agent, a deodorizing agent, an antibacterial agent, water, a surfactant, water-insoluble fine particles, an oxidation inhibitor, a reducing agent and the like can be added and mixed into the water absorbent resin, during polymerization or after polymerization, in an amount of about 0% to 30% by weight, and more particularly, 0.01% to 10% by weight. Chelating agents that can be suitably used are listed in U.S. Pat. No. 6,599,989, WO 2008/090961, and the like, and surfactants or lubricating agents are listed in U.S. Pat. No. 6,107,358, U.S. Pat. No. 7,473,739, and the like.

[4] PHYSICAL PROPERTIES OF WATER ABSORBENT RESIN

The water absorbent resin of the present invention contains a polyacrylic acid (salt)-type water absorbent resin as a main component, and when it is intended to be used in sanitary products, particularly in disposable diapers, the water absorbent resin may be obtained by the polymerization method, surface crosslinking method and the like described above. Furthermore, it is preferable for the water absorbent resin thus obtainable to have at least one physical property under control, among the various physical properties that will be described in the following sections (4-1) to (4-7), and it is more preferable to have two or more, particularly three or more, physical properties including AAP under control. If the water absorbent resin does not satisfy the various physical properties such as described below, there is a risk that the water absorbent resin may not exhibit satisfactory performance in high concentration diapers having a water absorbent resin concentration of 40% by weight or greater.

(4-1) Initial Color Tone

The water absorbent resin obtainable by the present invention is such that in order for the resin to be used as a raw material for sanitary products such as disposable diapers, it is preferable that the water absorbent resin be a white powder. Therefore, in the measurement based on Hunter's Lab color system using a spectroscopic colorimeter, the L value (Lightness) as the initial color tone is preferably 85 or greater, more preferably 87 or greater, and still more preferably 89 or greater. Furthermore, the a value is preferably −2 to 2, more preferably −1 to 1, still more preferably −0.5 to 1, and particularly preferably 0 to 1. Furthermore, the b value is preferably −5 to 10, more preferably −5 to 5, and still more preferably −4 to 4. Meanwhile, the upper limit of the L value is 100; however, if the L value is 85 or greater, there is no problem with the color tone in sanitary products and the like. Furthermore, the YI (Yellow Index) value is preferably 10 or less, more preferably 8 or less, and still more preferably 6 or less. Furthermore, the WB (White Balance) value is preferably 70 or greater, more preferably 75 or greater, and still more preferably 77 or greater.

The initial color tone refers to the color tone of the particulate water absorbing agent after manufacturing, and generally refers to the color tone that is measured before factory shipment. However, the initial color tone may also be the color tone measured within one year from manufacturing if stored in an atmosphere of 30° C. or lower and a relative humidity of 50% RH.

The water absorbent resin of the present invention exhibits a sufficient degree of whiteness even in storage under high temperature and high humidity, in an acceleration test for evaluating coloration over time upon long-term storage.

(4-2) AAP (Absorption Against Pressure)

The AAP (absorption against pressure) of the water absorbent resin obtainable by the present invention is such that in order to prevent leakage from disposable diapers, when the drying step described above is used as a means for achieving the prevention, the AAP under a pressure of 1.9 kPa, and preferably 4.8 kPa, is preferably 20 [g/g] or greater, more preferably 22 [g/g] or greater, and still more preferably [g/g] or greater. The upper limit of the AAP is not particularly limited, but in view of the balance with other physical properties, the upper limit is preferably 40 [g/g] or less. When the AAP is less than 20 [g/g], if such a water absorbent resin is used in an absorbent core, there is a risk that a sanitary product which exhibits less return of liquid (usually, also referred to as "re-wet") when pressure is applied to the absorbent core, may not be obtained, and it is not preferable.

(4-3) SFC (Saline flow conductivity)

The SFC (saline flow conductivity) of the water absorbent resin obtainable by the present invention is such that in order to prevent leakage in disposable diapers, when the drying step described above is used as a means for achieving the prevention, the SFC is preferably $1[\times 10^{-7} \cdot cm^3 \cdot s \cdot g^{-1}]$ or greater, more preferably $10[\times 10^{-7} \cdot cm^3 \cdot s \cdot g^{-1}]$ or greater, still more preferably $50[\times 10^{-7} \cdot cm^3 \cdot s \cdot g^{-1}]$ or greater, particularly preferably 70 $[\times 10^{-7} \cdot cm^3 \cdot s \cdot g^{-1}]$ or greater, and most preferably $100[\times 10^{-7} \cdot cm^3 \cdot s \cdot g^{-1}]$ or greater under a pressure. The upper limit of the SFC is not particularly limited, but is preferably 3,000 $[\times 10^{-7} \cdot cm^3 \cdot s \cdot g^{-1}]$ or less, and more preferably $2,000[\times 10^{-7} \cdot cm^3 \cdot s \cdot g^{-1}]$ or less. When the SFC exceeds $3,000[\times 10^{-7} \cdot cm^3 \cdot s \cdot g^{-1}]$ or greater, if such a water absorbent resin is used in an absorbent material, there is a risk that liquid leakage in the absorbent material may occur, and it is not preferable.

(4-4) CRC (Absorption Capacity without Load)

The CRC (absorption capacity without load) of the water absorbent resin obtainable by the present invention is preferably 10 [g/g] or greater, more preferably 20 [g/g] or greater, still more preferably 25 [g/g] or greater, and particularly preferably 30 [g/g] or greater. The upper limit of the CRC is not particularly limited, but in view of the balance with other physical properties, the upper limit is preferably 50 [g/g] or less, more preferably 45 [g/g] or less, and still more preferably 40 [g/g] or less. If the CRC is less than 10 [g/g], the amount of water absorption of the water absorbent resin is low, and there is a risk that the water absorbent resin may not be suitable for the use in the absorbent core in sanitary products such as disposable diapers. Furthermore, when the CRC is greater than 50 [g/g], if such a water absorbent resin is used in an absorbent core, there is a risk that a sanitary product having an excellent liquid uptake rate may not be obtained, which is not preferable.

(4-5) Ext (Water-Extractables)

The Ext (water-Extractables) of the water absorbent resin obtainable by the present invention is preferably 35% by weight or less, more preferably 25% by weight or less, still more preferably 15% by weight or less, and particularly preferably 10% by weight or less. If the Ext is greater than 35% by weight, the gel strength of the water absorbent resin thus obtainable is weak, and there is a risk that liquid permeability may deteriorate. Furthermore, when such a water absorbent resin is used in an absorbent material, there is a risk that a water absorbent resin which exhibits less return of liquid (re-wet) when pressure is applied to the absorbent material, may not be obtained, and it is not preferable.

(4-6) Residual Monomers

The amount of residual monomers of the water absorbent resin obtainable by the present invention is usually controlled to 500 ppm or less, from the viewpoint of safety, when the drying step described above is used as a means for achievement, preferably to 0 ppm. to 400 ppm, more preferably to 0 ppm to 300 ppm, and still more preferably 0 ppm to 200 ppm.

(4-7) Moisture Content Ratio

The moisture content ratio of the water absorbent resin obtainable by the present invention is adjusted to 0.1% to 10% by weight, and more preferably 1% to 8% by weight, from the viewpoints of the water absorption rate and impact resistance, when the drying step described above is used as a means for achievement.

[5] USE OF WATER ABSORBENT RESIN

The use of the water absorbent resin obtainable by the production method according to the present invention is not particularly limited, and the water absorbent resin can be used in sanitary products such as disposable diapers, sanitary napkins, and incontinence pads; and water absorbent articles such as agricultural and horticultural water retention agents, wastewater solidifying agents, and industrial water stopping materials. The water absorbent resin obtainable by the present invention exhibits especially excellent performance in water absorbent articles which use a water absorbent resin at high concentrations. That is, the content (core concentration) of the water absorbent resin in the absorbent core in the water absorbent articles is preferably 30% to 100% by weight, more preferably 40% to 100% by weight, still more preferably 50% to 100% by weight, further still more preferably 60% to 100% by weight, particularly preferably 70% to 100% by weight, and most preferably 75% to 95% by weight. When the core concentration is set to the range described above, the effects of the present invention can be exhibited more effectively, and thus it is preferable. Particularly, when the water absorbent resin obtainable by the present invention is used in the upper layer part of the absorbent core in the core concentration range described above, the diffusivity of absorbed liquid such as urine is excellent because of high liquid permeability (liquid permeability under pressure), and the amount of water absorption of the water absorbent article as a whole, such as a disposable diaper, is enhanced by efficient liquid distribution. Therefore, it is preferable. Furthermore, it is also preferable because a water absorbent article in which a state of whiteness with a sense of hygiene can be provided.

EXAMPLES

Hereinafter, the present invention will be described more specifically by way of Preparation Examples, Examples, and Comparative Examples; however, the present invention is not intended to be limited to these Examples. Examples that are obtainable by appropriately combining the technical means respectively disclosed in different Examples, are also included in the scope of the present invention.

[Methods for Measuring Physical Properties]

In the following descriptions, unless particularly stated otherwise, measurements were made according to the measuring methods indicated in section [1] Definitions of terms.

<Particle Size>

The particle size distribution and mass median particle size (D50) were measured by sieving the particles with JIS standard sieves according to US Patent Application Publication No. 2006/204,755.

<Mass Median Particle Size (D50) of Water-Containing Gel>

The mass median particle size was measured by using the wet classification method described in paragraph [0091] of JP 2000-63527 A.

<Solids Content (Resin Solids Content)>

The solids content (resin solids content) represents the proportion occupied by components that do not volatilize in 3 hours at 180° C., in the water absorbent resin, and is in the following relationship with the moisture content ratio.

Solids content (resin solids content) [wt %]=100− moisture content ratio [wt %]    [Mathematical Formula 7]

Meanwhile, the solids content (resin solids content) was measured by the following operation.

In an aluminum cup having a diameter of the bottom of 4 cm (about 5 cm) and a height of 2 cm, 1.00 g of a water absorbent resin was uniformly spread on the bottom of the aluminum cup, and the total weight of the aluminum cup [W1 (g)] was measured. This was left to stand for 3 hours in a hot air dryer with the temperature adjusted to 180° C., and the total weight of the aluminum cup [W2 (g)] immediately after (within at least one minute) the cup was removed from the hot air dryer was measured. The total moisture content ratio (wt %) was calculated from these W1 and W2 according to the following formula.

Solids content [wt %]=(W2−W1)/(weight of the water absorbent resin powder or surface cross-linked water absorbent resin)×100    [Mathematical Formula 8]

<FSR (Water absorption rate)>

The FSR (water absorption rate) [g/g/s] of 1.00 g of a water absorbent resin against 20 g of saline was determined according to the measurement method disclosed in WO 2009/016055.

Preparation Example 1

An aqueous monomer solution was prepared by mixing acrylic acid (containing 70 ppm of methoxyphenol), a 48 wt % aqueous solution of sodium hydroxide, industrial pure water, polyethylene glycol diacrylate (average molecular weight: 523), and an aqueous solution of trisodium diethylenetriamine pentaacetate, and sodium persulfate was added thereto. The concentration of the monomer component in the aqueous monomer solution was 53 wt %, the neutralization ratio of acrylic acid was 70 mol %, the concentration of polyethylene glycol diacrylate was 0.017 mol % (relative to the monomer component), the concentration of trisodium diethylenetriamine pentaacetate was 50 ppm (relative to the monomer component), the amount of addition of sodium persulfate was 0.017 mol % (relative to the monomer component), and the temperature of the aqueous monomer solution at the time of addition of sodium persulfate was 95° C. Polymerization proceeded rapidly, and a polymer gel was obtained. The polymer gel was crushed (grain-refined) by a cutter mill (manufactured by Yoshiko Corp., Model RC250) (polymer gel 1). The gel particle size after crush (grain-refining) was such that the average gel particle size D50 was 2.0 mm, and particles having a particle size of 1 mm or less were included at a proportion of 10 wt %. Furthermore, the solids concentration of the polymer gel (water-containing gel-like cross-linked polymer) 1 obtained after crush was 70 wt %.

Example 1

A batch type hot air dryer having a drying chamber with a diameter of 13 cm and a height of 50 cm (retaining a polymer gel and a dried product on a stainless steel mesh having a mesh size of 300 μm and a ratio of opening area of 36%) was preheated in advance by means of a gas stream (air) flowing upward at a velocity of 2.0 [m/s] and a temperature of 180° C. At this time, the temperature of the heat exchanger was 220° C. Meanwhile, the exhaust line of this dryer was attached with a filter (a mesh having openings with a mesh size of 150 μm, made of stainless steel; opening area per hole=0.02 mm$^2$; ratio of opening area=36% (mesh size: 150 μm, wire diameter: 100 μm)), and the temperature of the gas stream during the passage through the filter was 90° C. Furthermore, the exhaust line was branched after the filter, so that a portion of the gas that had passed through the exhaust line was discharged out of the dryer, while the remaining portion of the gas was designed to be reheated to 180° C. at the heat exchanger and to circulate in this dryer. Meanwhile, during this drying step, the circulation ratio of the high temperature gas stream was adjusted to 80%. The polymer gel 1 was introduced into the dryer, and the height of the gel layer was 10 cm. Most of the polymer gel was in a bulk state and was not fluidized; however, it was found that fine water-containing gel particles were suspended by the gas stream. After drying for one hour, the gas stream was stopped, and the water absorbent resin particles captured on the filter were examined. The water absorbent resin particles included particles having a particle size of greater than or equal to 150 μm and less than 850 μm at a proportion of 57 wt %, and particles having a particle size of 850 μm or greater at a proportion of 0.1 wt %.

The dried product obtained by the drying step described above was pulverized by a roll mill, and was classified with standard sieves having mesh sizes of 850 μm and 150 μm. Thereby, a particulate water absorbent resin (1) having a particle size of greater than or equal to 150 μm and less than 850 μm was obtained. The solids content of this particulate water absorbent resin (1) was about 96 wt %, and the CRC was 33 [g/g].

The water absorbent resin particles captured on the filter occupied 0.05 wt % of the dried product. Meanwhile, the proportion thereof with respect to the particulate water absorbent resin (1) was 0.06 wt %. The exhaust of this dryer was reheated by the heat exchanger at a temperature of 220° C., but there were no colored foreign substances found by visual inspection. Furthermore, a drying step for one month (repeated operation of batch drying: 200 times) could also be carried out stably.

Comparative Example 1

The operation was carried out in the same manner as in Example 1, except that the filter was removed. When the particles in the exhaust of the dryer were collected and reheated at 220° C., brown colored foreign substances were recognized by visual inspection. Furthermore, a drying step for one month (repeated operation of batch drying: 200 times) was carried out, and the drying efficiency gradually decreased.

Example 2

The polymer gel 1 obtained in Preparation Example 1 was spread on the belt of a ventilated band dryer with a yawing type belt at an almost uniform gel layer height (gel layer height: 70 mm). This ventilated band dryer was composed of six chambers, and the belt speed was controlled so as to have a retention time of 5 minutes for each room, that is, 30 minutes in total. The polymer gel or water absorbent resin was retained by a punching plate in which most of the nearly rectangular holes having a length of 3 mm and a width of 1 mm were opened, and the ratio of opening area was 30%. The area occupancy was 95%. The temperature, flow velocity and flow direction of the hot air (high temperature gas stream) used in each chamber were controlled as follows. Meanwhile, the temperature of the hot air was measured immediately before the contact of the hot air with the polymer gel. The environments in the six chambers of the ventilated band dryer were adjusted as described below.

[Chemical Formula 1]
First chamber: 160° C., 2.2 [m/s], upward
Second chamber: 180° C., 2.2 [m/s], upward
Third to sixth chambers: 180° C., 2.5 [m/s], downward The first and second chambers have the structure shown in FIG. 1, while the third to sixth chambers have the structure shown in FIG. 3. In the respective chambers, the polymer gel was exposed to hot air, and then the hot air was passed through a stainless steel filter having a mesh shape (opening area per hole=0.02 mm$^2$; ratio of opening area=36% (mesh size: 150 μm, wire diameter: 100 μm)) and was reheated by a heat exchanger at 220° C. to be reused. The circulation ratio was controlled to 90% to 95% in all of the chambers.

The dried product thus obtained formed plate-shaped aggregates. These aggregates were loosened separately with a hammer-shaped pulverizer, and were further pulverized with a roll mill. The pulverization product thus obtained was classified with sieves having mesh sizes of 850 μm and 150 μm, and a particulate water absorbent resin (2) retained between the two sieves was obtained. The solids concentration of the particulate water absorbent resin (2) was 95 wt %, the CRC was 34 [g/g], and the FSR was 0.16 [g/g/s].

Production of the particulate water absorbent resin was continued for one month, but colored foreign substances were hardly observed, and the operation was carried out stably. The amount of the water-containing gel captured on the filter was 0.001 wt % of the dried product, and particles having a particle size of greater than or equal to 150 μm and less than 850 μm occupied 50 wt % of the captured water-containing gel.

Comparative Example 2

The operation was carried out in the same manner as in Example 2, except that a filter was not placed. After several days from the initiation of operation, colored foreign substances were occasionally observed. Furthermore, the heat exchange efficiency gradually decreased. After one month of operation, when the heat exchanger was checked, brown colored particles having a particle size of 150 μm or greater were found to be adhering to the heat exchanger.

Example 3

A surface crosslinking step was carried out subsequently to Example 2. That is, a surface crosslinking agent solution containing 0.4 parts by weight of 1,4-butanediol and 3 parts by weight of ion-exchanged water was added and mixed into 100 parts by weight of the particulate water absorbent resin (2). Furthermore, the mixture was heat-treated for 40 minutes using the dryer of Example 1, by adjusting the velocity of the gas stream to 1 m/s and the temperature to 200° C. (heat exchanger temperature: 240° C.). Meanwhile, during the heat treatment, the water absorbent resin was fluidized. The CRC of the water absorbent resin thus obtained was 28 [g/g], and the AAP was 24 [g/g]. The above-described operation was repeated for one month (200 times), but no colored foreign substances were observed.

Example 4

A surface crosslinking step was carried out subsequently to Example 2. That is, a surface crosslinking agent solution containing 0.4 parts by weight of 1,4-butanediol and 3 parts by weight of ion-exchanged water relative to 100 parts by weight of the particulate water absorbent resin (2), was sprayed and mixed into the particulate water absorbent resin in a mixer (trade name: TURBULIZER, manufactured by Hosokawa Micron Corp.). Furthermore, the mixture was heat-treated with a fluidized bed dryer (fluidized bed length: 850 mm, fluidized bed width: 240 mm) which had been adjusted in advance to have a hot air temperature of 205° C., a gas velocity of 0.5 m/sec, and a heat transfer pipe temperature of 205° C. Meanwhile, a cyclone was installed in the exhaust line, so that the collected particles were returned to the drying chamber. The high temperature gas stream that had passed through the cyclone was passed through a stainless steel filter having a mesh shape (opening area per hole=0.02 mm$^2$; ratio of opening area=36% (mesh size: 150 µm, wire diameter: 100 µm)), and a portion thereof was exhausted, while the remaining portion was reheated with a heat exchanger at about 230° C. and circulated. The circulation ratio was 95%. The operation as described above was carried out for one month, but incorporation of any colored foreign substances was hardly observed, and the heat treatment could be stably carried out. After completion of the operation, when the filter was inspected, the water absorbent resin was captured in an amount corresponding to 0.02 wt % of the heat-treated products obtained for one month.

Example 5

Figure 4:
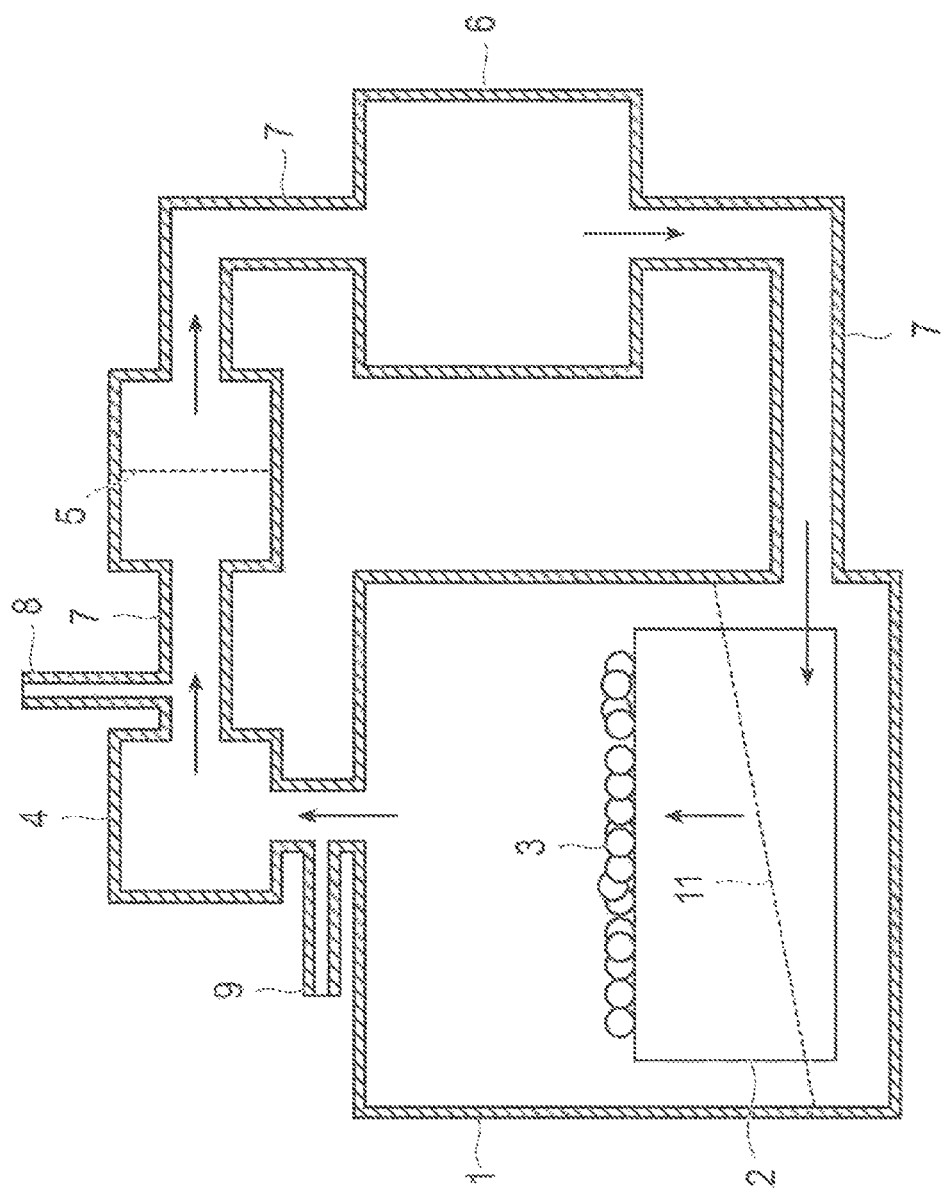
FIG. 4 is a schematic diagram illustrating still another exemplary embodiment of the present invention.

The operation was carried out in the same manner as in Example 2, except that the high temperature gas streams of the first and second chambers of the dryer were reheated by a heat exchanger 6 as illustrated in FIG. 4, subsequently passed again through a second filter 11 (ratio of opening area: 25%, punching metal having circular holes), and reused. Thus, a particulate water absorbent resin (5) was obtained. The solids concentration of the particulate water absorbent resin (5) was 96 wt %, and the CRC was 34 [g/g].

Production of the particulate water absorbent resin was continued for one month, but colored foreign substances were hardly observed, and the operation was carried out stably without drying unevenness. The amount of the water-containing gel captured on the filters (filters before and after the heat exchanger) was 0.001 wt % of the dried product, and particles having a particle size of greater than or equal to 150 µm and less than 850 µm occupied 60 wt % of the captured water-containing gel.

Example 6

50 parts by weight of the product which was obtained by pulverization and classification in Example 2 and passed through a sieve having a mesh size of 150 µm (water absorbent resin fine powder (2)) and 50 parts by weight of ion-exchanged water were mixed in a horizontal mixer (trade name: TURBULIZER, manufactured by Hosokawa Micron Corp.). 10 parts by weight of a hydrate of the water absorbent resin fine powder thus obtained, and 100 parts by weight of the polymer gel (1) of Preparation Example 1 were introduced into the dryer of Example 2, and the subsequent procedure was carried out in the same manner as in Example 2. Thus, a particulate water absorbent resin (6) was obtained. The solids concentration of the particulate water absorbent resin (6) was 94 wt %, the CRC was 33 [g/g], and the FSR was 0.21 [g/g/s].

Production of the particulate water absorbent resin was continued for one month, but colored foreign substances were hardly observed, and the operation was carried out stably without drying unevenness. The amount of the water-containing gel captured on the filters (filters before and after the heat exchanger) was 0.001 wt % of the dried product, and particles having a particle size of greater than or equal to 150 µm and less than 850 µm occupied 40 wt % of the captured water-containing gel. Meanwhile, the remaining components of the captured water-containing gel contained a large amount of the water absorbent resin fine powder and aggregates thereof.

Preparation Example 2

In a reactor formed by attaching a lid to a jacketed double-armed kneader made of stainless steel having two sigma-shaped blades, 5450 parts by weight of an aqueous solution of sodium acrylate having a neutralization ratio of 73 mol % (monomer concentration: 39 wt %) and 11.5 parts by weight (0.09 mol % relative to the monomer) of polyethylene glycol diacrylate (molecular weight: 523) were introduced and dissolved to obtain a reaction liquid. Meanwhile, the content of p-methoxyphenol in the acrylic acid used was 70 ppm. Subsequently, this reaction liquid was degassed for 30 minutes in a nitrogen gas atmosphere. Subsequently, 29.5 parts by weight of a 10 wt % aqueous solution of sodium persulfate and 24.5 parts by weight of a 0.1 wt % aqueous solution of L-ascorbic acid were separately added to the reaction liquid under stirring at 20° C. Polymerization was initiated after approximately one minute. Polymerization was carried out (peak temperature: 95° C.) while the water-containing gel-like cross-linked polymer thus produced was pulverized, and after 30 minutes from the initiation of polymerization, a particulate polymer gel (2) was obtained. The mass median particle size (D50) of the polymer gel (2) thus obtained was about 1300 µm, and the solids content was 41 wt %.

Example 7

The polymer gel (2) obtained in Preparation Example 2 was dried by exposing the polymer gel to hot air by using a ventilated band dryer having the structure shown in FIG. 4 and having a punching plate for retaining a polymer gel (material: SUS304, shape of holes: oval holes arranged in zigzags, size of holes: width 1.2 mm and length 15 mm, ratio of opening area: 27%), under the conditions of a drying time of 35 minutes, a hot air temperature of 150° C., and an average flow velocity of hot air of 1.0 [m/s] (drying step 1). Subsequently, the hot air (high temperature gas stream) was passed through a stainless steel filter having a mesh shape (area of opening per hole=0.02 mm$^2$; ratio of opening area=36% (mesh size: 150 µm, wire diameter: 100 µm)) and was reheated by a heat exchanger 6 at 220° C. The hot air was passed again through a second filter 11 (ratio of opening area: 25%, punching metal having circular holes) and reused, and thus a dried product (7-1) was obtained. Meanwhile, the hot air used for the drying step was a mixed gas of water vapor and air, and the dew point temperature was fixed at 60° C. Furthermore, the hot air was caused to flow upward in a direction perpendicular to the punching plate surface. The flow rate was measured by using a constant temperature anemometer, ANEMOMASTER (registered trademark) 6162 (manufactured by Kanomax Japan, Inc.).

Subsequently, the dried product (7-1) thus obtained was pulverized and classified by using JIS standard sieves having mesh sizes of 850 μm and 150 μm in this sequence. In the classification operation, particles having a particle size of less than 150 μm, which passed through the JIS standard sieve having a mesh size of 150 μm, were obtained as water absorbent resin fine particles (7) (solids concentration: 96 wt %, amount of addition (collection): 20 wt %). The water absorbent resin fine particles (1-1) thus obtained was agglomerated according to the agglomeration method disclosed in Agglomeration Example 1 of U.S. Pat. No. 6,228,930, and thus water-containing agglomerate particles (7) (solids concentration: 45 wt %) were obtained.

Subsequently, separately, 100 parts by weight of the polymer gel (2) obtained in Preparation Example 2 and 15 parts by weight of the water-containing agglomerate particles (7) obtained as described above were mixed (to obtain a gel mixture (7)), and the mixture was introduced into the same ventilated band type hot air dryer as that used in the drying step in the production of the water-containing agglomerate particles (drying step 2; hot air temperature: 150° C., average flow velocity of hot air: 2.0 [m/s], dew point: 70° C. at the time of initiation of drying, 40° C. at the time of completion of drying).

Subsequently, the dried product (7-2) thus obtained was pulverized by using a roll mill pulverizer, and then was classified by using a JIS standard sieve having a mesh size of 425 μm and a JIS standard sieve having a mesh size of 300 μm in this sequence. Thus, a water absorbent resin powder (7-2) having a particle size of greater than or equal to 300 μm and less than 425 μm was obtained. The solids concentration of the water absorbent resin powder thus obtained was 96 wt %, the CRC was 31.5 [g/g], and the FSR was 0.25 [g/g/s].

The amount of the water-containing gel captured on the filters (filters before and after the heat exchanger) in the drying step 2 was 0.0005 wt % of the dried product (7-2), and particles having a particle size of greater than or equal to 150 μm and less than 850 μm occupied 40 wt % of the captured water-containing gel. Meanwhile, the remaining components of the captured water-containing gel contained a large amount of the water absorbent resin fine powder and aggregates thereof.

Example 8

The operation was carried out in the same manner as in Example 7, except that the flow velocity of the high temperature gas stream (flow rate: 2.0 [m/s], temperature: 180° C.) of the hot air dryer used to dry the gel mixture (7) in Example 7, was decreased to 0.9 [m/s]. As a result, the water absorption rate (FSR) decreased to 0.24 [g/g/s], and it was understood that the flow velocity (preferably, 1.0 to 2.9 [m/s]) is important for the water absorption rate.

Example 9

The operation was carried out in the same manner as in Example 7, except that the temperature of the high temperature gas stream (flow rate: 2.0 [m/s], temperature: 180° C.) of the hot air dryer used to dry the gel mixture (7) in Example 7, was lowered to 145° C. As a result, the water absorption capacity (CRC) decreased to 28.3 [g/g], and it was understood that the drying temperature (preferably, 150° C. to 190° C.) was important for the water absorption capacity.

INDUSTRIAL APPLICABILITY

The water absorbent resin obtained by the production method according to the present invention has less coloration or colored foreign substances and has excellent water absorption performance (water absorption capacity, water absorption rate, and the like). Thus, the water absorbent resin is appropriate for sanitary materials such as disposable diapers, sanitary napkins, and incontinence pads.

Furthermore, the present patent application is based on Japanese Patent Application No. 2010-130608 filed Jun. 8, 2010, the entire disclosure of which is incorporated herein by reference.

The invention claimed is:

1. A method of producing a particulate water absorbent resin, the method comprising:
    polymerizing an aqueous solution of unsaturated monomer; and
    drying a particulate water-containing gel-like cross-linked polymer having a solids concentration of 30% by weight or greater that is obtainable by a gel grain refining step during polymerization or after polymerization,
with one or more apparatuses for aerating any one of the particulate water-containing gel-like cross-linked polymer, a dried product, a pulverization product, or a classification product thereof as a water absorbent resin with a high temperature gas stream in the drying and/or in at least one of the subsequent steps,
wherein in the aerating apparatus, the high temperature gas stream used for aeration is passed through a filter and then a portion or all of the high temperature gas stream is reused in the same step as the step where the aerating apparatus is installed, or in a different step.

2. The method according to claim 1, wherein the aerating apparatus to aerate high temperature gas stream to any one of the particulate water-containing gel-like cross-linked polymer or a dried product thereof is a ventilated dryer used in the drying step.

3. The method according claim 1, wherein the filter is a mesh or punching metal made of stainless steel.

4. The method according to claim 1, wherein the high temperature gas stream used for aerating the water absorbent resin is reused after being reheated, and the passage of the high temperature gas stream through a filter occurs before the reheating of the high temperature gas stream.

5. The method according to claim 1, wherein the passage of the high temperature gas stream through a filter is carried out at plural different sites.

6. The method according to claim 1, wherein the flow rate of the high temperature gas stream is 0.1 to 5 [m/s] at the place of aeration of any one of the particulate water-containing gel-like cross-linked polymer, the dried product, the pulverization product, or the classification product thereof as a water absorbent resin, and the temperature is 100° C. to 250° C.

7. A method of producing a particulate water absorbent resin, the method comprising:
    polymerizing an aqueous solution of unsaturated monomer; and
    drying a particulate water-containing gel-like cross-linked polymer having a solids concentration of 30% by weight or greater that is obtainable by a gel grain refining step during polymerization or after polymerization,
with one or more apparatuses for aerating the particulate water-containing gel-like cross-linked polymer or the dried product thereof as a water absorbent resin with a high temperature gas stream in the drying and/or in at least one of the subsequent steps, wherein, after aerating the particulate water-containing gel-like cross-linked polymer or the dried product thereof as a water absorbent resin with a high temperature gas stream, a portion or all of the high temperature gas stream is reused, and the aerating apparatus is a ventilated dryer used in the drying step; and in the drying step using the ventilated dryer, the high temperature gas stream used for aerating the particulate water-containing gel-like cross-linked polymer or the dried product thereof is reheated before reuse, and is further passed through a filter having a ratio of opening area of 1 to 70%, which is composed of any one or more of a wire mesh that is installed before the reheating or a punching metal that is installed after the reheating, and then the water absorbent resin is aerated with the high temperature gas stream under the conditions of a flow rate of 0.1 to 5 [m/s] and a temperature of 100° C. to 250° C.

8. The method according to claim 1, wherein the mesh size of the filter is 0.01 to 50 [mm$^2$]

9. The method according to claim 1, wherein the ratio of opening area of the filter is 1% to 70%.

10. The method according to claim 7, wherein a punching metal having a mesh size of 0.1 to 500 [mm$^2$] and a ratio of opening area of 1% to 70% is used as a filter after the reheating of the high temperature gas stream.

11. The method according to claim 7, wherein a wire mesh having a mesh size of 0.01 to 50 [mm$^2$] and a ratio of opening area of 1% to 70% is used as a filter before the reheating of the high temperature gas stream.

12. The method according to claim 1, wherein the amount of capture of the water absorbent resin particles or a water-containing gel that is captured on the filter, is greater than 0% by weight and less than 0.1% by weight, relative to the production output of the water absorbent resin.

13. The method according to claim 1, wherein the flow direction of the high temperature gas stream is upward to any one of the particulate water-containing gel-like cross-linked polymer, the dried product, the pulverization product, or the classification product thereof as a water absorbent resin to be aerated with the high temperature gas.

14. The method according to claim 1, wherein the high temperature gas stream in the same step as the step in which the aerating apparatus is installed is reused and the circulation rate of the high temperature gas stream determined by the following formula is 50% to 99.99%:

Circulation rate of high temperature gas stream [%]= [1−(total amount of high temperature gas stream discharged out of the system [m$^3$])/(total amount of high temperature gas stream used at the flow velocity of the water absorbent resin [m$^3$])×100.

15. The method according to claim 1, wherein at least a portion of the high temperature gas stream is discharged out of the system, and the heat energy of the discharged high temperature gas stream is recycled.

16. The method according to claim 7, wherein the solids concentration of the particulate water-containing gel-like cross-linked polymer is 45% by weight or greater.

17. The method according to claim 7, wherein the particulate water-containing gel-like cross-linked polymer comprises a mixture of particulate water-containing gel-like cross-linked polymers having different solids concentrations.

18. The method according to claim 7, wherein in the polymerization step, the solids concentration of the particulate water-containing gel-like cross-linked polymer is increased by evaporation of water, or by addition of a water absorbent resin fine powder or a hydrate thereof.

19. The method according to claim 1, wherein the water absorbent resin is a polyacrylic acid (salt)-type water absorbent resin, and the unsaturated monomer contains acrylic acid (salt) as a main component and contains 1 ppm to 1,000 ppm of methoquinone.

20. The method according to claim 7, wherein the ventilated band in a ventilated band dryer to be used in the drying step is a punching metal with the opening area ratio of 15% to 50%.

* * * * *